(12) United States Patent
Sistanizadeh et al.

(10) Patent No.: US 6,681,232 B1
(45) Date of Patent: Jan. 20, 2004

(54) OPERATIONS AND PROVISIONING SYSTEMS FOR SERVICE LEVEL MANAGEMENT IN AN EXTENDED-AREA DATA COMMUNICATIONS NETWORK

(75) Inventors: Kamran Sistanizadeh, San Francisco, CA (US); Masoud M. Kamali, San Francisco, CA (US)

(73) Assignee: Yipes Enterprise Services, Inc., San Francisco, CA (US)

( * ) Notice: Subject to any disclaimer, the term of this patent is extended or adjusted under 35 U.S.C. 154(b) by 262 days.

(21) Appl. No.: 09/861,887

(22) Filed: May 22, 2001

Related U.S. Application Data
(60) Provisional application No. 60/209,802, filed on Jun. 7, 2000.

(51) Int. Cl.[7] .................. G06F 17/00; G06F 15/173; G06F 9/00
(52) U.S. Cl. .................. 707/104.1; 707/103; 709/224; 709/226; 709/104
(58) Field of Search .................. 707/104.1, 1, 100, 707/102, 103; 709/224, 226, 229, 220, 223, 225, 104; 370/258; 713/153

(56) References Cited

U.S. PATENT DOCUMENTS

| | | |
|---|---|---|
| 5,375,070 A | 12/1994 | Hershey et al. |
| 5,650,994 A | 7/1997 | Daley |
| 5,740,355 A | 4/1998 | Watanabe et al. |
| 5,802,041 A | 9/1998 | Waclawsky et al. |
| 5,946,302 A | 8/1999 | Waclawsky et al. |
| 6,003,079 A | 12/1999 | Friedrich et al. |
| 6,018,625 A | 1/2000 | Hayball et al. |
| 6,041,352 A | 3/2000 | Burdick et al. |
| 6,108,782 A | 8/2000 | Fletcher et al. |
| 6,137,782 A | 10/2000 | Sharon et al. |
| 6,243,746 B1 * | 6/2001 | Sondur et al. ............ 709/220 |
| 6,466,974 B1 * | 10/2002 | Nelson et al. ............ 709/223 |
| 6,529,499 B1 * | 3/2003 | Doshi et al. ............ 370/352 |

OTHER PUBLICATIONS

Schneider et al "Management of virtual private networks for integrated broadband communication", ACM 1993, pp. 224–237.*

Puka et al "Service level management in ATM networks", Proceedings. International conference on information technology: coding and computing, Mar. 2000, pp. 324–329.*

Fuller "Network managemetn using expert diagnositcs", International journal of network management, 1999, pp. 199–208.*

Suite–Wide Product Options [online]. Concord Communications, 2001 [retrieved on Jan. 15, 2001]. Retrieved from the Internet:<URL: http://www.concord.com/products/ehealth/options/options.htm>. 2 pages.

Live Health [online]. Concord Communications, 2001 [retrieved on Jan. 15, 2001]. Retrieved 2 pages from the Internet:<URL: http://www.concord.com/products/ehealth/livehealh/liveheatlth.htm>.

(List continued on next page.)

Primary Examiner—Uyen Le
(74) Attorney, Agent, or Firm—McDermott, Will & Emery

(57) ABSTRACT

An automated service level manager (SLM) provides operations support for wide-area data communication services offered via regional IP-Over Ethernet on fiber networks. The SLM comprises a suite of software components and associated hardware running the software, to communicate with agents throughout the networks, to accumulate various network operations data for reports and alarms and to provide instructions to control network operations. The SLM preferably offers a web server type user interface. This interface enables access by technical personnel of the carrier, for example from a network operations center. This interface also offers access to customers having or seeking service through the network.

44 Claims, 10 Drawing Sheets

OTHER PUBLICATIONS eHealth Suite [online]. Concord Communications, 2001 [retrieved on Jan. 15, 2001]. Retrieved from the Internet:<URL: http://www.concord.com/products/ehealth/ehealth/htm>. 1 page.

JYRA Solutions [online]. Jyra Research Ltd., 1997–2000 [reteived on Jan. 15, 2001]. Retrieved from the Internet: <URL: http://www.jyra.com/solutions/performance.html>. 3 pages.

SMA Server Product Overview. Jyra Research Ltd., 2000. 2 pages.

Universal Data Collection for Your Internet Business Infrastructure. Narus Virtual Analyzers. NARUS, Inc., 2001. 2 pages.

Hardware Solutions for Semantic Traffic Analysis. Narus Analyzers. NARUS, Inc. No date 4 pages.

* cited by examiner

OPERATIONS AND PROVISIONING SYSTEMS FOR SERVICE LEVEL MANAGEMENT IN AN EXTENDED-AREA DATA COMMUNICATIONS NETWORK

CROSS-REFERENCE TO RELATED APPLICATION

This application claims the benefit of U.S. Provisional Application No. 60/209,802, entitled "OPERATIONS AND PROVISIONING SYSTEMS FOR MANAGED IP SERVICE OVER AN OPTICAL FIBER METRO AREA NETWORK," filed on Jun. 7, 2000, the disclosure of which is entirely incorporated herein by reference.

FIELD OF THE INVENTION

The concepts involved in the present inventions relate to operations support, provisioning and the like for managed IP services in a new IP over fiber to the premises type metropolitan area network.

BACKGROUND

The explosive growth of e-commerce, Internet-based businesses, and multimedia streaming is creating an insatiable demand for network bandwidth. At the same time, new network-enabling technologies are fueling the desire for bandwidth by opening up new possibilities for its use. This in turn has accelerated the emergence of more data-intensive applications, which are further fueling the demand for bandwidth. This cycle is driving a spiraling demand for bandwidth and the technology to support and deploy this bandwidth.

Until recently it was a given that data sometimes did not get through, or packet delivery might be sporadic, or only at a best-effort rate. However, with the accelerating rise in the level of complexity and sophistication in e-commerce, real-time transaction processing, and media streaming, this is no longer acceptable. Service levels must now be defined and adhered to. While "Quality of Service" (QoS) is a concept with a nominal standards-body derived definition, the requirements for Extranet/Intranet networking services are driving QoS towards metrics which are clearly measurable, verifiable, and reportable.

Furthermore, meeting these QoS metrics is becoming a stringent requirement for service providers to meet their contractual obligations. Thus, Quality of Service and the measurement and assurance of QoS have taken a significant role in defining future network architecture requirements. This has in turn created new traffic engineering challenges for network service providers. There is now a need to be able to guarantee various performance metrics, such as minimum latency, bandwidth or jitter, across shared network infrastructures. Customers require guarantees of one or more of these metrics to ensure proper performance, for example for latency sensitive applications such as Voice-over-IP (VoIP) or for bandwidth-intensive applications such as streaming multimedia. Designing an architecture that can meet this requirement is an engineering challenge. Integrating this architecture with the unpredictability and underestimated capacity of the public Internet becomes even more of a challenge.

Business customer requirements for network services are becoming increasingly sophisticated and stringent. The salient features such as network reliability, security, resource availability, network configuration flexibility, service profile manageability, and application based QoS networked elements are prerequisites for real-time business applications. To meet such requirements, the underlying network platform should have multifaceted features and functionality. The capacity of the transport network not only should be large enough to accommodate future growth, but also flexible enough to be apportioned on a dynamic, on-demand basis. Additionally, the platform should support Layer 3 routing as well as Layer 2 switching in order to accommodate different customer network architectures and protocols.

With the development of any type of network that might meet the general needs outlined above there comes an attendant need for improved systems for operations support, provisioning and management of the IP services provided to the customers. Customers are demanding that the services be up and running or running in the latest requested modified form, within minutes of a new service request. Customers also are demanding that the data network provide an ever increasing degree of reliability. To allow a carrier to meet these customer demands, there is a clear need for network monitoring, management and support systems, which allow the carrier to maintain and provision the network quickly and efficiently. There also is an associated need to monitor the performance of the network, to monitor and manage the "health" thereof. Such monitoring must be able to determine and report a wide range of relevant performance metrics, which may impact on customer traffic and/or show compliance with customer' service level agreements.

SUMMARY OF THE INVENTION

With the developments of an advanced communication network, meeting the general communication needs outlined above, Applicants also have developed improved systems for operations support, for monitoring, provisioning and management of the IP services provided to the customers by such an advanced metropolitan area fiber network or the like.

In one aspect, the invention contemplates a service level manager, for operations support in an extended-area data communications network. The service level manager comprises at least one network database, storing network topology information. Preferably the information in the database(s) further includes service and customer information. The database(s) also receive and store dynamic service-related operations data, from agents in the network. A persistence layer module processes data from the network database(s). This processing provides data representing a dynamic view of the topology as well as data representing operations of the extended-area data communications network. The service level manager also includes a user interface, for providing information to and receiving inputs from users. As disclosed, the user interface is accessible both by carrier staff personnel and by end-use customers.

The inventive manager further includes a service level manager application, in communication with the persistence layer module and the user interface. The functions of this application include monitoring the operations of the extended-area data communications network, by analyzing semantic transparency or time transparency of data traffic through the network based on the data provided by the persistence layer module from the agents in the network. The application provides reports to users, via the user interface, of the monitored network operations with respect to specific network services. The application also interacts with elements of the extended-area data communications network to control service traffic through the network, for example to increase a customer's bandwidth upon request as input by the customer or by carrier staff.

The service level manager application preferably is a multi-layered, modular, scalable, distributed, verifiable, data-driven, vendor independent, and platform neutral architecture, for example, based on Enterprise Java Beans. The service level manager application may deliver unified service level management to the carrier's customers, partners, staff personnel and other operations support systems. The preferred form of this inventive application provides service layer and network management layer services, such as QoS monitoring/reporting and automatic bandwidth increases/decreases. The service level manager application collects network and service related operations data from various agents, analyzes this data and transforms the data into accessible knowledge. The application also provides a convenient interface to interact with the network elements, to modify operations thereof on an as-needed basis in real-time.

In one embodiment, the application layer comprises a topology service module, for obtaining network or service topology information from the network database(s). This layer also includes a monitoring service module, for communicating with the agents to obtain the dynamic service-related operations data. The service level manager application further comprises a provisioning service module. This module converts a service provisioning request into instructions for implementing a service change identified by the request. This conversion is based at least in part on the network or service topology information obtained by the topology service module. In this embodiment, the service level manager application also includes a measurement service module. This module computes reports of the monitored network operations from data accumulated by the monitoring service module.

In the preferred embodiments, the inventive operation support systems manage an inventive type of distributed data communications network. Such a network comprises a plurality of regional networks. Each of the regional networks includes access ring networks, which include edge-point of presence (E-POP) switches and at least one mega-point of presence (M-POP) switch. Data links extend from the E-POP switches to individual customer locations. An optical fiber access ring interconnects the E-POP switches and at least one M-POP switch, in each access ring network. Each regional network also includes an optical fiber backbone ring, which interconnects the M-POP switches of the various access ring networks. The network may include multiple backbone rings. At least one giga-point of presence (G-POP) switch, coupled to the optical fiber backbone ring, provides data communication to the Internet as well as data communication to and from other regional networks via the Internet.

Another aspect of the invention contemplates the addition of out-of-band management, to a distributed data network of the type described in the preceding paragraph. In this aspect of the invention, there is a service level operations support system comprising operations support agents at various points in each of the regional networks. The system including agents at the G-POP switches for monitoring and control of the G-POP switches. The service level operations support system includes at least one management system, such as an implementation of the inventive service level manager or a network operations center. The service level operations support system also includes an out of band signaling system. This signaling system includes a router coupled to the management system and routers coupled to the agents at the G-POP switches. An out-of-band network connects between the routers, for providing data communications between the management system and the agents at the G-POP switches. In the preferred embodiment, the out-of-band network includes a wide area data network that is independent of the regional networks and may include back-up links for dial-up communications via the public switched telephone network.

Further aspects of invention relate to the unique software products for implementing the inventive operations support systems, such as the service level manager. A software product, in accord with such an aspect of invention, includes at least one machine-readable medium and information carried by the medium. The information carried by the medium may be executable code, and/or one or more databases of network related information. These inventive concepts encompass operation from a single, common computer system, although it is also envisaged that the code and/or the database(s) may reside in separate media and run on two or more programmed computer systems in communication via network components.

A computer readable medium, as used herein, may be any physical element or carrier wave, which can bear instructions or code for performing a sequence of steps in a machine-readable form or associated data. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer or the like may receive and decode.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

Figure 1:
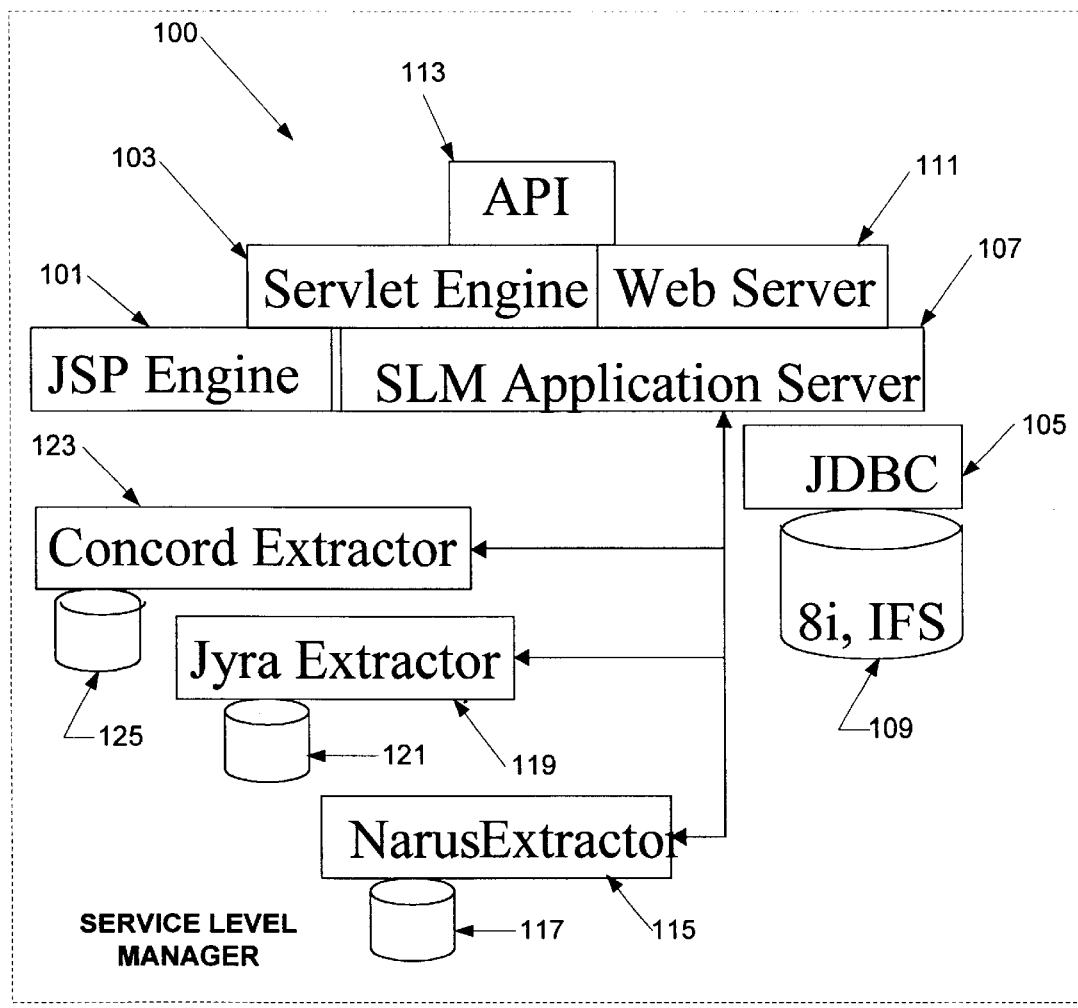
FIG. 1 is a functional block diagram of a service level manager, for network operations support, in accord with the present invention.

Reference now is made in detail to the presently preferred embodiments of the invention, examples of which are illustrated in the accompanying drawings, wherein like reference numerals indicate like elements throughout the several views.

A. Operations Support Systems—Overview

One element of the inventive operations support systems is a service level manager (SLM). The SLM essentially comprises a suite of software components and associated hardware running the software, to communicate with agents throughout the network to accumulate various network operations data for reports and alarms and to provide instructions to control network operations. Aspects of the invention also relate to the interaction of this manager with specific types of monitoring and control agents.

The underlying service or production network provides managed transport for all communication services using IP over fiber-transport. Principles of local area network (LAN) routing are extended to the metro-area environment. Service is targeted at high-speed data applications, such as video streaming and broadcasting. The high-speed data network supports services ranging from text and voice over IP to broadband applications rich in multimedia content. The network allows customers to obtain necessary bandwidth and other quality of service features, on demand.

In such an environment, control of customer data rates can be both tighter and more flexible. Accordingly, the inventive operations support systems allow provisioning for a customer with a minimum committed information rate (CIR), yet can also permit the customer to burst at much higher data rates, as the customer's applications or server loads may demand. These guarantees are engineered into the network and bandwidth provisioning procedures. The network operator manages individual customer bandwidth at the network edge and ensures that all customers' CIR rates can be met by adequate provisioning of the backbone network. In addition, the network can allocate additional bandwidth to customers with no changes in physical network topology, protocols, or hardware.

With the inventive optical IP network architecture, an upgrade of a customer's bandwidth requires only minor changes in network configuration settings. Furthermore, this can be done from a centralized location in a matter of seconds. This means that all the traditional efforts of advance planning, lead-time estimates, and outages due to physical router and cabling changes are no longer necessary. It also means that a customer's network bandwidth can grow in lock step with its needs.

Multiple profiles are defined based on traffic requirements such as latency or error sensitivity. Each profile is mapped to dedicated, aggregated bandwidths to ensure all classes of traffic can be handled with the proper priority and have access to the appropriate resources.

These parameters are formalized in the form of a contracted Service Level Agreement (SLA). The SLA defines the terms and parameters by which QoS can be measured and evaluated. Reporting methods and compensation are also defined in the event that performance levels are not met. SLA metrics are offered in the following areas:

Network Availability
Latency
Committed Information Rate
Time to Report
Time to Respond
On-Time Provisioning
Packet Loss
Jitter
Service Availability The operations support systems for the network use multiple processes to ensure performance in accord with the service level agreements (SLAs), which the carrier executes, both with its customers and with its upstream Internet service providers (ISPs). These processes include continuous testing and verification of network latency, continuous monitoring of network traffic and network status, and a Customer Experience Center with a web interface to facilitate communications between customers and various technical levels, on a 24×7 basis.

Management of a highly dynamic IP network requires an intelligent customer service relationship as well as a highly sophisticated Operations Support System (OSS) platform. The inventive OSS platform provides two levels of network management services - management of the network Access and Distribution levels, and management of the backbone.

B. Service Level Manager (SLM)—Overview

The full flexibility of the operations support system is realized particularly by means of a Service Level Manager (SLM) 100, as shown in FIG. 1. The main functions of the service level manager 100 are to check and report on the 'health' of the underlying network and to make sure that the network delivers services to customers as promised, e.g. in accord with service level agreements (SLAs) between the carrier and the customers.

The SLM 100 comprises a distributed system composed of data collectors, data analyzers, data managers and application servers. The SLM 100 may be accessed by carrier personnel, for example at the network operations center (NOC) or by customers, using a web based interface and appropriate communications links. From the customers' perspective, this web interface provides the Customer Experience Center, as an always-on point of contact for operations support.

The SLM 100 utilizes a distributed software system. The software analyzes data collected by various software Agents (SNMP Agents, Latency Measurement Agents, Utilization Agents, etc.). The SLM software creates reports/benchmarks on the health of the network and services. The system and software also provide service provisioning capabilities, for example to upgrade/downgrade bandwidth on demand. The SLM 100 tracks and reports on SLA violations. Another feature of the SLM enables feeding of multimedia content to the Customer CPE. The SLM software provides operating personnel an abstract view of Network/Service topology. The service level manager also provides a well-defined interface to an Order Manager system and other OSS components.

As shown in FIG. 1, the service level manager 100 comprises a JavaServer Pages (JSP) Engine 101, a Servlet Engine 103, a JDBC driver 105, a service level manager (SLM) Application Server 107, and a number of data extractors. The service level manager 100 also comprises an Oracle 8*i* database Internet File Server (IFS) 109. A variety of other relational and/or object-oriented databases could be used in place of the Oracle product. The Web Server 111 allows the customer and other users to interact with the service level manager application 107, via HTML and XML over HTTP.

The SLM application server 107 is implemented as a multi-tiered architecture and built on a framework, which is based on Enterprise Java Beans. The SLM application server 107 communicates with the Web Server 111 via HTTP through which it receives TSP Service Request Packets. The payload of such a packet is an HTML document (and in future a XML Document). Upon receipt of a TSP Service Request, a message handler engine 101 or 103 retrieves the field that specifies the particular request, selects the appropriate module or entity that can handle the request and passes it to that particular module (or Bean). Upon completion of a task, the entity returns the results to the Message Handler, which in turn notifies the Web Server 111. Depending on the type of Request, the SLM application server 107 may send the results to the original requester (e.g. Customer) directly through its Servlet and JSP capabilities.

The SLM application server 107 relies on a Relational Database in Server 109, which contains information on the Network and Service Topology, network and service metrics, SLA parameters, customer demarcation points, service scope and boundaries, etc. Communication among TPS modules and this database uses JDBC, as the SLM application server 107 is implemented in Java language.

In general, Java Database Connectivity (JDBC) 105 provides a standard application programming interface (API) 113 which allows the SLM application 107 to access relational data, for example, in the IFS database in server 109. JDBC provides standard features such as simultaneous connections to several databases, transaction management, simple queries, calls to stored procedures, access to a database dictionary, etc. Essentially, the JDBC driver 105 converts JDBC invocations to calls, which are sent to the Oracle database server 109.

In a similar manner, a series of extractors allows the SLM application 107 to access data compiled and maintained in other databases. FIG. 1 shows three extractors with associated databases.

The first extractor 115 is associated with a database 117 of traffic analysis data. The extractor 115, for example, serves as an associated manager to compile IP detailed records for sessions conducted throughout the network. As discussed more later, a Narus analyzer is essentially an intelligent "sniffer." The analyzer passively reviews the data passing through a specified link or port and captures selected data therefrom in a non-intrusive fashion, i.e., without impacting service. In particular, the analyzer has access to all layers of the protocol stack, and it is session aware. The analyzer transmits the data to the SLM 100, for storage in database 117, and the extractor 115 makes the data available to the application 107.

An extractor 119 provides access to a database 121 of network latency information, preferably accumulated by Jyra latency agents, which perform ongoing latency testing in the network. The actual measurements use Jyra latency agents, and the software for such an agent and the associated manager may be provided by Jyra Inc. The Jyra software also offers useful SNMP proxy capabilities.

The extractor 123 compiles network health reports from data provided by various agents, such as SNMP agents. An example of such a product is Concord Health, a software product sold by Concord Communications of Marlboro, Mass.

The extractors and databases shown are examples only of components that provide traffic information, latency information and network health information. Comparable products are available from other sources. Although note separately shown, the service level manager 100 may include one or more other extractors, which provide access to additional databases of network operations information.

The SLM 100 utilizes agents throughout the network to collect the necessary data regarding network operations. Examples of such agents include: SNMP Agents, RMON Agents, System Agents, Special Agents such as latency measurement agents, Enterprise Agents, Application Agents, and Network Agents.

Element Layer Network Agents are software managers running in specific network elements, such as the Extreme Element Manager running on Extreme switches in various network nodes, for monitoring and reporting on the utilization and health of the respective network elements. RMON Agents collect and report on segment-specific traffic patterns. System Agents collect and report system resources such as memory, I/O utilization and CPU utilization, log file size, etc. Application Agents collect and report system resources consumed by applications, such as memory usage per application. SNMP Agents collect and report MIB attributes. Special Agents collect and report service-specific parameters. For example, latency agents collect data regarding latency between points and/or latencies involved in certain functions, such as DNS translation. Enterprise Agents have a global view of the business process and usually rely on data collected by other agents.

Those skilled in the art will recognize that the various software elements and databases illustrated in FIG. 1 may run on a single computer system or run in a distributed fashion in numerous physical computers.

C. The Underlying Production Network

Figure 2:
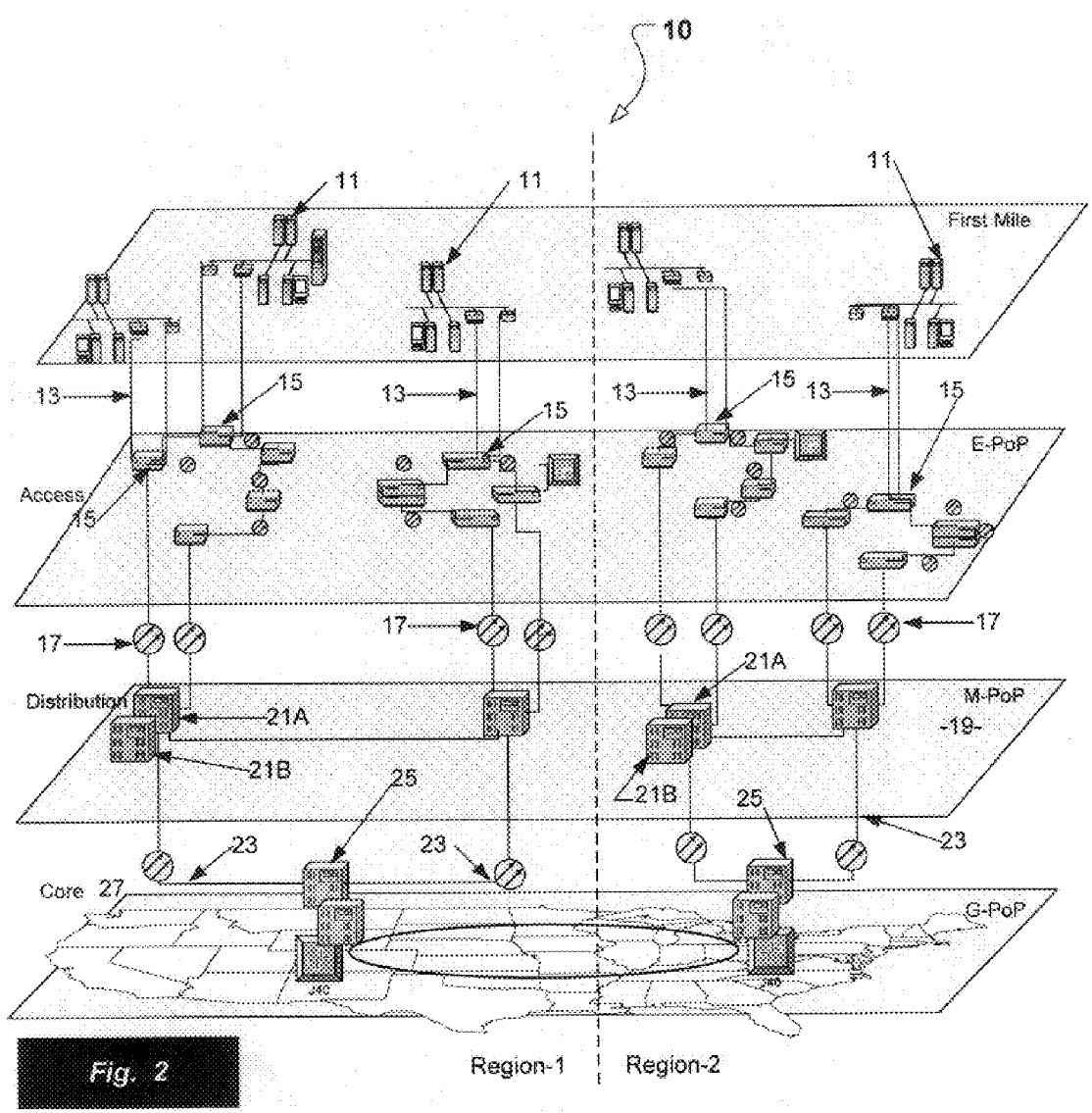
FIG. 2 is a schematic diagram of the overall topology of a network, which preferably is managed in accord with aspects of the present invention.

To appreciate the operation and advantages of the inventive service level manager and the interaction thereof with customers and with other OSS systems, it may be helpful first to consider an example of an advanced data network, for which the service level manager preferably provides operational support. In that regard, FIG. 2 provides a high-level functional illustration of the preferred implementation of the service or production network 10, which carries the traffic to and from the end-use customers.

The drawing shows the network topology organized into a series of logical "planes." The top plane provides first mile connectivity for end user equipment 11. Typically, a customer'data equipment 11 connects through an RJ45 jack and CAT-5 cable 13 to a first level data switch, formning an edge point of presence (E-POP) 15 in the access plane. The E-POP 15, for example, often is located in the basement of a multi-story building complex or at a designated common site within a building complex or campus environment. The E-POP switch 15 preferably is a giga-bit Ethernet switch. The term "data switch" is used herein to refer to any device providing protocol layer 2 data switching and preferably protocol layer 3 data routing. The term "router" refers to a device providing at least layer 3 routing service.

A given metro-area or region will have optical fibers 17 forming one or more rings. Up to ten E-POP switches 15 are concatenated together with a mega point of presence (M-POP) via such an optical fiber access ring. The M-POPs 19 preferably comprise two linked data switches 21A, 21B, which are elements of both the access network and the regional backbone network. The M-POPs 21 in turn connect via optical fiber 23 to a giga-POP (G-POP) hub switch center 25 of a regional backbone network and/or a national backbone network referred to as the Core 27. A number of M-POPs 19 and a G-POP 25 in each region preferably are connected together by the optical fibers 23 to form a backbone ring.

The use of the rings in the access layer and the distribution layer provides redundancy and thereby helps to increase the over-all reliability of the network. Each ring provides two-way communication. Any switch on the ring therefore has two paths over which to communicate, one in each direction around the ring. If one side of the ring fails, the switch will typically still be able to communicate in the opposite direction around the ring. In the preferred embodiments, these rings also use parallel fibers in each span, for increased capacity and further redundancy.

The optical fiber transport of the Ethernet signals extends from the customer premises equipment 11 all the way through the backbone network to the boundary with the Core 27. The various POPs provide switching at protocol Layer 2 as well as routing at protocol Layer 3. Unlike earlier fiber networks, the inventive network directly transports the Ethernet framing signals via the optical fibers. Lower level protocol signals formerly used at or near the physical layer (L1) and the data link layer (L2), such as SONET and ATM, are eliminated from the subscriber drops, the local access rings and the rings extending to the backbone. Only if there is an interface to a network at the customer edge or at the core, which does not support Giga-bit Ethernet, will there be a need for a protocol conversion to SONET or the like.

Individual customers may subscribe to a wide range of types and rates of services. For example, the data rate at the RJ45 jack may appear as a 1 Mbps service, as a 10 Mbps service or as a 100 Mbps service. Within a given service, the customer is guaranteed at least the specified data rate and at times may obtain burst rate services much higher than the nominal subscription service rate. The network elements essentially throttle the service of a particular customer at the customer port, based on a service profile for that customer. To maximize the service flexibility to the customer, the network also offers the customers on-line access to their service profiles, for example, via the web-based interface to the SLM 100.

In practice, the actual bandwidth achieved may be less than the maximum depending upon a number of factors. This is because a network connection can only run as fast as its weakest link. In the case of Internet service, the weak link often may be an overloaded web server or a lower bandwidth connection (such as a T1) into a remote web site. It may also be the customer's own firewall or proxy server, since most of these devices were never designed to operate at Ethernet wire speed. Care must be taken to understand that simply having an exceptionally high bandwidth connection can uncover new network bottlenecks, which had not previously been considered.

The services supported through the network include Internet connectivity, point-to-point or multipoint-to-multipoint connectivity, or even voice service using Voice-over-IP. The network also supports an expanded form of local area network extension service, referred to as a metro-area network or 'MAN' service. Now each MAN is defined only by a logical architecture, not physical or geographical limitations. As such, customer devices 11 of a particular virtual LAN or MAN may reside anywhere that the customer has obtained access to the metro-area network through an E-POP 15.

The network traffic generally can be broken down into four classes of service, Internet traffic, MAN traffic, time critical traffic such as Voice-over-IP, and network management and signaling traffic. The data switches in the network assign different priority levels to these different classes of traffic and prioritize transport thereof accordingly.

Figure 3:
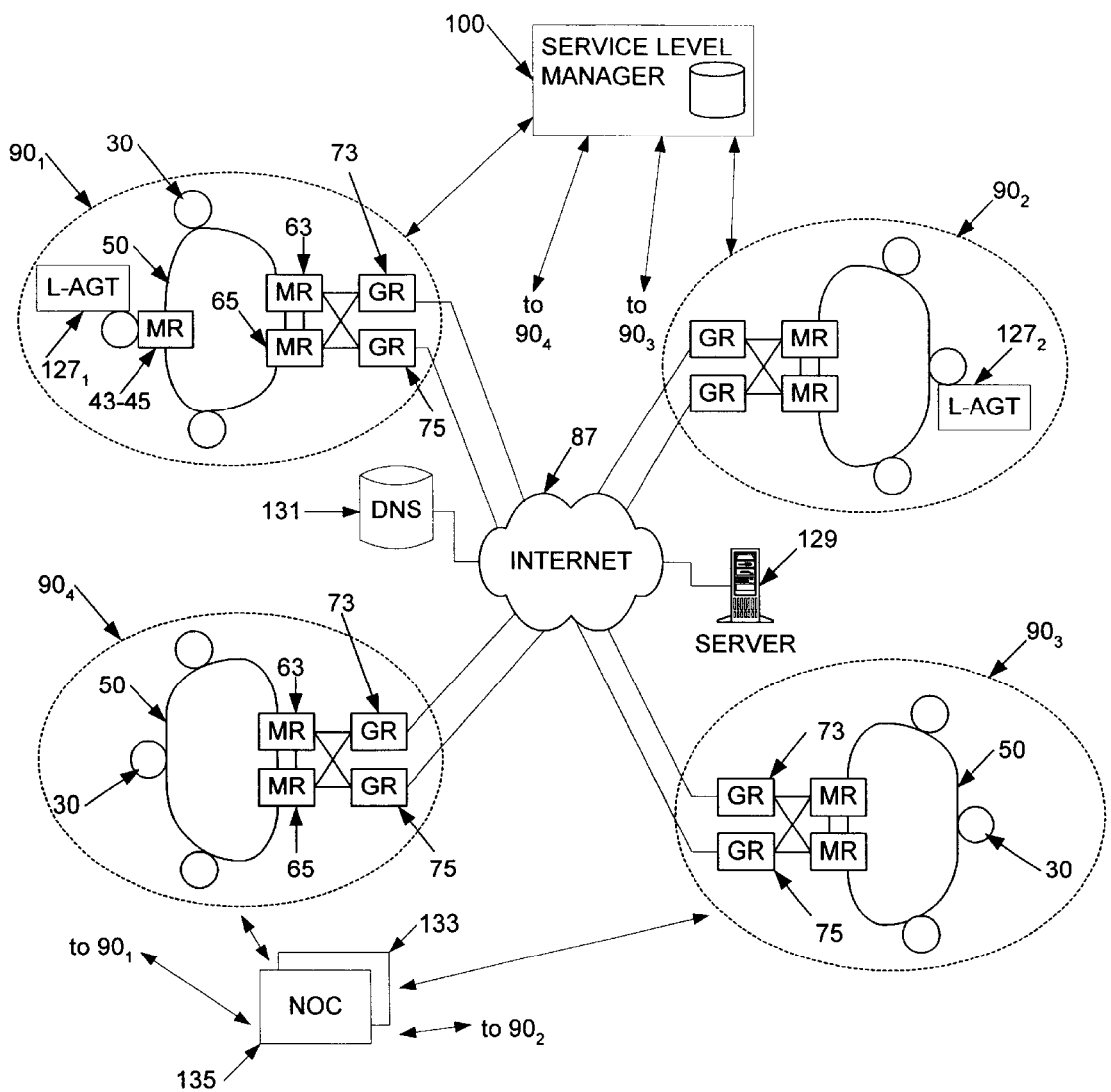
FIG. 3 is an alternative illustration of the overall topology of the network of FIG. 2 showing interconnection of elements thereof with certain elements of the inventive operations support systems.

FIG. 3 provides an alternate illustration of the network topology and illustrates the interconnection to the inventive service level manager. That drawing shows a number of regional networks 90, e.g. Tour regional networks $90_1$, $90_2$, $90_3$ and $90_4$. Each of the regional networks 90 comprises a number of access rings 30 and a backbone ring 50. The regional networks 90 provide communications access to servers or other devices on the Internet 87. The regional networks 90 also provide communications to and from customers' devices served through the different regions, for example to provide the MAN-type local area network (LAN) extension type of service. For this later purpose, the regional networks 90 may communicate with each other via a backbone network (not shown), but preferably the regions 90 may communicate with each other via the public Internet 87.

FIG. 3 shows the switch routers of an M/G-POP in each region, represented in simplified form as two M-POP routers (MR) 63 and 65 interconnected with the two G-POP routers (OR) 73 and 75. The GR switches 73, 75 essentially form the boundary routers of the regional networks 90 with respect to the Internet 87. Each regional network 90 comprises a backbone distribution ring 50 coupled to the M-POP routers (MR) 63 and 65 and to a number of access rings 30 in the particular region.

Figure 4:
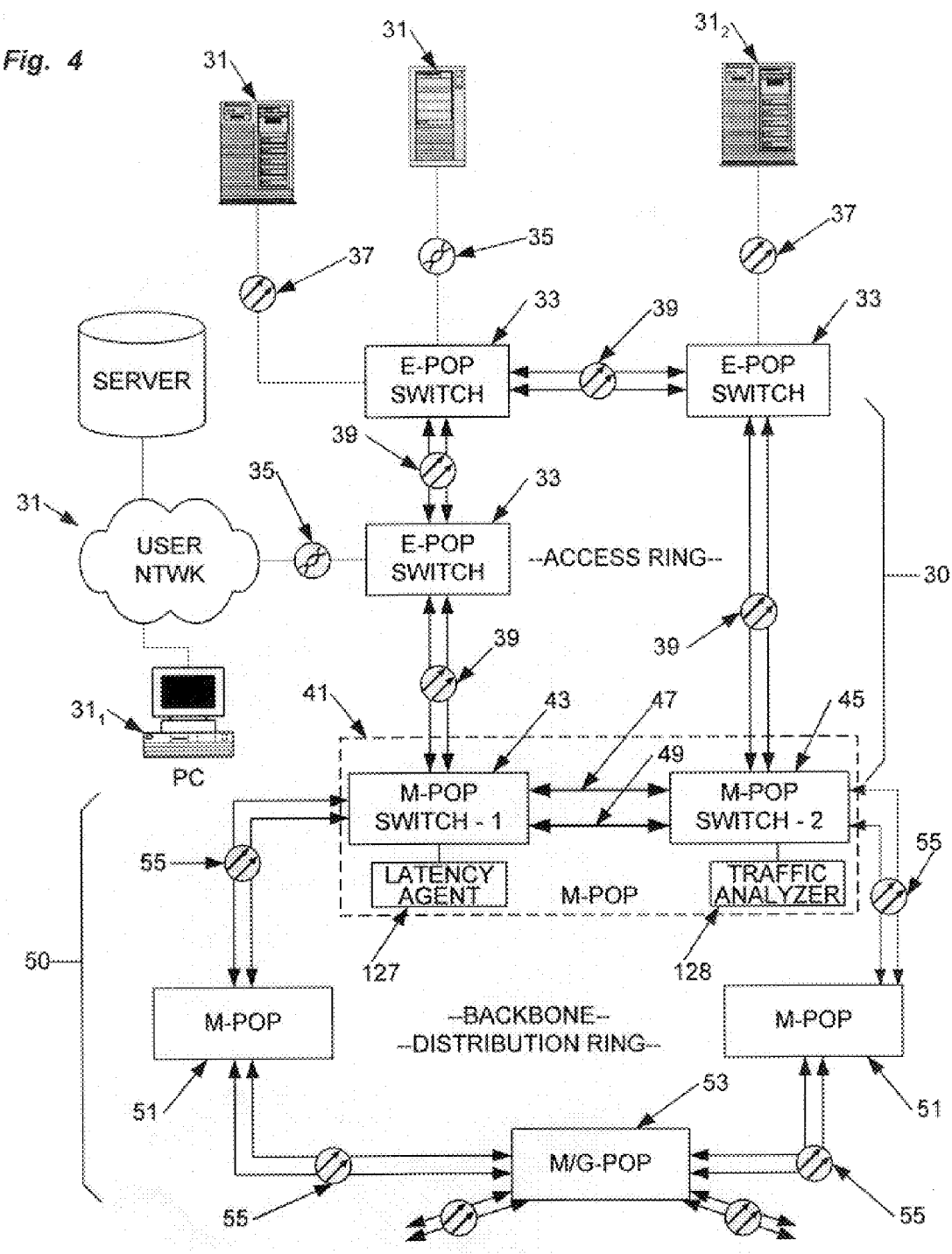
FIG. 4 is a functional block diagram of a portion of one of the regional networks, showing more details of one of the access rings and one of the backbone distribution rings.

FIG. 4 shows a metro-area portion of one of the regional networks, in somewhat more detail. In the example of FIG. 4, an access ring 30 serves end-user equipment 31 within a number of buildings. Each end user's system 31 connects to an E-POP data switch 33, typically through a CAT-5 twisted wire pair 35, but in some cases through an optical fiber link 37. Each customer's end user equipment 31 may comprise a variety of different mainframe or server type computer systems or some combination of servers and personal computers linked together by a private network of the user. Each E-POP data switch 33 serves a number of user systems within the respective building or campus.

The connections between the E-POP data switch 33 and the end user systems 31 are shown as a star topology, although a ring topology could be used. The connections 35 and 37 to the end user systems 31 support 10 baseT (10

Mb/s) Ethernet or 100 baseT (100 Mb/s) Ethernet or Gigabit (1000 Mb/s) Ethernet. The fiber links 37 may be single mode or multimode links. It is preferred that the links 35 are twisted wire pairs, and the links 37 comprise single or paired optical fibers. In some cases, however, the links to the end user systems 31 may use wireless radio or wireless optical technologies. Coaxial cable or other physical media also may be used.

Since the E-POP switch is just that—a network switch—there are many different ways a customer could conceivably connect to it, with very few restrictions. What is reasonable or necessary depends on each customer's requirements and the scope of their networking needs.

Depending on the Customer's network architecture, the Customer may be using some type of network edge device such as a router, firewall, or proxy server as the point of connection to the E-POP switch 33. In other cases, the Customer may have a switch to further branch out connections to a combination of these devices. In all cases, connections preferably are made using either straight-through or cross-over Category 5 cabling with RJ-45 connectors.

In the presently preferred embodiment, the customer ports of the E-POP switches 33 are normally set to operate at 10/100 Base-T with Auto Negotiation. Depending on customer bandwidth requirements, the switch ports will be set to 10 or 100 Mbps, Full Duplex. For full duplex operation, the hardware on the customer's side of the link must also support full duplex, and there must be no other devices on the Ethernet segment. Port configuration (speed and duplex) settings for the E-POP will be set to match the characteristics of the customer's application and/or the customer's router, switch, or other device which will connect to the access ring 30.

The maximum rate at which a customer can send data packets into the network ("bursting") is physically limited in one of two ways. The physical limit of the cable may serve as the maximum transmission limit (i.e. 10 or 100 Mbps). Alternatively, this rate is set by QoS policy provisioned within the E-POP switch 33, so that the logic of the E-POP limits the maximum effective bit rate. The network architecture is designed to use QoS policies to set the bandwidth to match the services desired by each customer. Thus, if a customer purchases 25 Mbps of bandwidth, the edge switch 33 in the serving E-POP limits the maximum rate at which data can traverse that customer's port to 25 Mbps in one and preferably both directions, even though the physical link is a 100 Mbps port.

Optical fiber pairs 39 interconnect the E-POP switches 33 and connect to an M-POP 41, to thereby form a redundant, two-way optical fiber ring, that is to say the access ring 30. Each fiber 39 in the ring 30 provides 1 Gb/s transport using Giga-bit Ethernet. Each POP on the access ring 30 views the parallel fibers as a single aggregate port, that is to say a single port having full duplex 2 Gb/s capacity. To further increase the capacity, it is possible to aggregate capacity of a plurality of parallel rings of pairs of fiber (not separately shown), for example to achieve up to 8 Gb/s transport capacity in each direction around the ring 30. Alternatively, the fiber pairs 39 could utilize coarse wavelength division multiplexing carrying logically separate Gb/s streams on separate wavelengths, to allow traffic aggregation and thereby achieve higher overall rates around the access ring 30. The network could also use dense wavelength division multiplexing (DWDM). With some additional equipment (not shown), the access ring 30 can currently support up to 60 Gb/s.

The M-POP 41 comprises a first data switch 43 and a second data switch 45. The switches 43 and 45 are interconnected by two high-speed data links 47 and 49. The first of these links 47 logically completes the loop of the access ring 30. The other link 49, however, forms an element of the distribution or backbone ring 50, albeit within the M-POP 41. The switches 43,45 of the M-POP may be considered as elements of the access ring 30 and/or as elements of the backbone ring 50. One such M-POP 41 may serve a number of sub-tending access rings 30, although only one such ring 30 is shown, for convenience.

Although switches from other vendors could be used, in an initial implementation, the E-POP switches 33 are Summit data switches from Extreme Networks. For example, the Summit48 provides a 17.5 Gbps non-blocking switch fabric and has a forwarding rate of 10.1 million packets per second (pps). The Summit48 comes with wire-speed Layer 2 switching and wire-speed basic Layer 3 routing using static routing or RIP V1/V2 routing protocols. However, with an available upgrade, the switch provides full Layer 3 switching, including support for protocols such as OSPF, DVMRP, PIM and IPX routing of multiple encapsulation types. This switch offers 48 10/100 Mb/s Ethernet ports as well as two full-duplex Gigabit Ethernet ports. The Summit48 also supports policy based priority queuing, for QoS (quality of service) functions.

As noted, the Summit48 supports OSPF (Open Shortest Path First). OSPF is a routing protocol that determines the best path for routing IP traffic over a TCP/IP network. OSPF is an interior gateway protocol (IGP), which is designed to work within an autonomous system, and it serves as a link state protocol. OSPF protocol is used in the inventive network for IP packet routing within each region. For OSPF purposes, the distribution ring 50 forms Area 0, and N access rings 30 form OSPF Areas 1 to N.

In the initial implementation, each of the data switches 43, 45 in the M-POPs is a 6800 series BlackDiamond from Extreme Networks. This class of data switch supports as many as thirty-two Gigabit Ethernet ports. The BlackDiamond is a shared-memory switch. Each slot has four Gigabit taps into the backplane. A load-balancing algorithm passes traffic between different line cards on the switch. The BlackDiamond supports a variety of routing protocols, including OSPF and 802.1Q-compliant VLANs (virtual LANs) as well as extensive standards-based QoS (quality of service) features. The BlackDiamond platform provides an OSPF ASBR (Autonomous System Boundary Router) functionality redistribution of routes. In preferred embodiments, these switches also run Boundary Gateway Protocol (BGP), for packet routing between regions and for packet routing to and from the Internet.

For OSPF purposes, the BlackDiamond switches 43, 45 bond the link 49 to OSPF Area 0. The switches bond the link 47 to the respective Area 1 to N of the particular access range 30.

The Summit switches and the BlackDiamond switches from Extreme Networks are exemplary platforms offering the desired data capacity and protocol support. Those skilled in the art will recognize, however, that switches from other vendors may be used. Also, the inventive architecture is readily scalable. Alternative data switches may be used to scale the services to higher data rates or to service more customers, as needed.

For operations support purposes, as discussed in more detail later, the M-POP 41 also includes certain management elements. For example, the M-POP switches 43, 45 implement SNMP agents for receiving control information from a management system and adjusting switch configurations in response thereto, for monitoring and periodically reporting certain status and network operations metrics to the management system, and for detecting and reporting alarm conditions.

The exemplary M-POP 41 also includes at least one latency agent 127 and at least one traffic analyzer 128. Initially, the latency agent 127 and the traffic analyzer 128 are implemented as stand alone elements connected through 10/100 baseT Ethernet ports on one or both of the M-POP switches 43, 45. There may be one latency agent 127 and one traffic analyzer 128 in the M-POP 41, or there may be one of each type of unit connected to each of the M-POP switches 43, 45. It is envisioned that one or both of these functions may be implemented in software within either or both of the M-POP switches 43, 45. Also, the functions may be moved out and/or duplicated at the E-POP switches 53. The functions of the SNMP agent, the latency agent 127 and the traffic analyzer 128 will be described in more detail, later.

The backbone distribution ring 50 includes a number of other M-POPs 51, serving different access rings (not shown). The M-POPs 51 are generally similar to the M-POP 41. In this embodiment, the distribution ring 50 also includes an M/G-POP 53.

Figure 5:
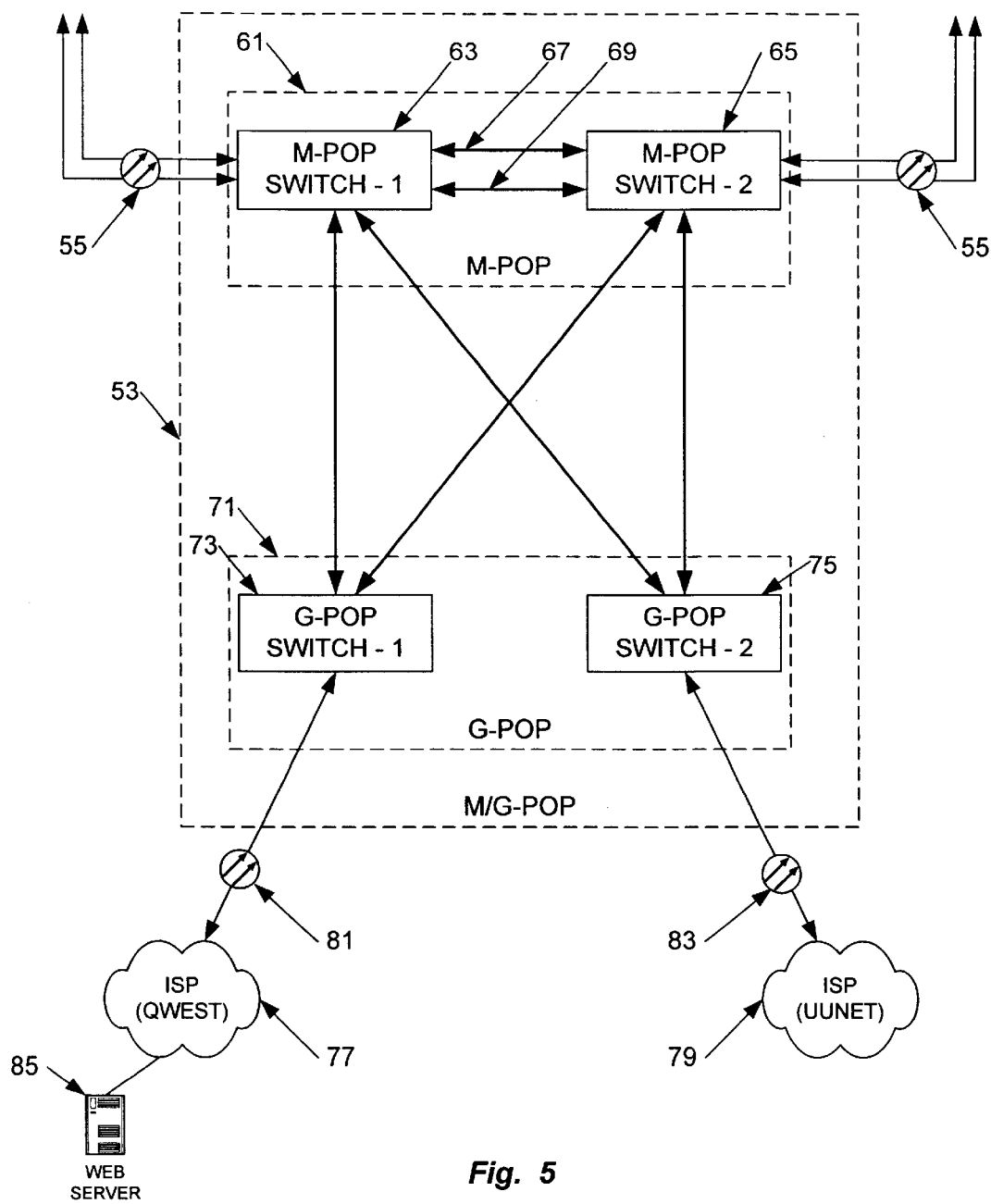
FIG. 5 is a functional block diagram of an M/G-POP, used in one of the regional networks.

The structure of the M/G-POP 53 essentially combines the elements an M-POP 61 and the elements of a G-POP 71, at one location, as shown in more detail in FIG. 5. The M-POP portion 61 of the MI/G-POP 53 comprises two data switches 63 and 64, which are similar to the switches 43, 45 discussed above. Links 67 and 69 provide a dual interconnection between the two data switches 63 and 64. Optical fiber pairs 55 connect the switches of the different M-POPs 41 and 51 together and connect to the M/G-POP 53, to thereby form a redundant, two-way optical fiber ring, that is to say the backbone distribution ring 50 (FIG. 4).

The preferred embodiment of the G-POP portion 71 of the M/G-POP 53 comprises a pair of Juniper M40 routers or similar capacity data switches 73 and 75. The data switches 73, 75 of the G-POP 53 at the boundary provide actual connection to the wider area packet data network, typically the public Internet, via one or more networks of backbone ISPs, such as the networks 77 and 79 of QWEST and UUNET. Alternatively, the routers or data switches 73, 75 providing the linkage to the Core network may be at a separate location, so as to form a separate G-POP. OC-12 (IP over SONET) links 81 and 83 connect the core routers or switches 73, 75 of the G-POP 71 to the networks 77 and 79 of the backbone ISPs, to insure compatibility with those legacy networks.

Operation and management of the regional networks 90 involves both automated monitoring and control through the service level manager (SLM) 100 and reporting to and control from technical staff at one or more network operation centers. The preferred embodiment utilizes two types of Network Operation Centers (NOCs) 133 and 135 (see also FIG. 10). The first NOC 133 provides fault management of the backbone. The first NOC 133 is responsible for maintaining the core IP links between the metropolitan regions 90.

The network typically includes a number of the NOCs 135, in some of the different regions 90. The second NOCs 135 maintain the edge network devices and routers serving the metropolitan regions 90. The SLM 100 provides information to and receives control instructions from staff personnel at the NOCs 135. The SLM 100 may be implemented as an integral element of the hardware/software of one or more of the NOCs 135, although in preferred embodiments, the SLM 100 comprises a number of standalone components that may be co-located with one of the NOCs 135.

Each G-POP switch 73 or 75 at the boundary of the regional network makes peer connections through the network 77 or 79. The network comprising the access ring(s) 30 and the distribution ring(s) 50 advertise their routes to peers on the Internet, and the other entities on the Internet advertise their routes, including advertisement to the network comprising the access ring(s) 30 and the distribution ring(s) 50. OSPF routing over the BlackDiamond platforms 43, 45 and over the Summit E-POP platforms 33 routes the customer traffic to the G-POP switches 73 and 75, where BGP4 speakers on the Juniper routers 71, 75 advertise the carrier's address space to the peers on the public Internet, e.g. via network 77 or network 79. A peering arrangement is negotiated to send and receive these advertisements. In addition, the G-POP routers 71, 75 in a number of separate regions form a confederation of logical iBGP peers, which appears as a single combined autonomous system to other networks on the Internet. The network carrier assigns a public IP address space for its Internet customers.

The network services include several broad classes or types of customer service. The first type of service is a metro-area network or MAN service that is a LAN extension or LAN-to-LAN service between business locations, based on Layer 2 connectivity, for example between the systems 311 and 312 in FIG. 4. The other general type of network service is NET service (high-speed Internet service). With the NET service, a customer on a PC or similar type of end user device 31, (FIG. 4) communicates through the access ring 40, the distribution ring 50 and one of the ISP backbone networks 77 or 79, with the desired Internet site, for example with a web server 85 (FIG. 5) using a standard web browser and Layer 3 routing. Both MAN service and NET service are scalable from 1 Mbps to 1 Gbps, in 1 Mbps increments. It is also possible to designate certain services as "Time Critical," and the network will prioritize the communications to such services, accordingly.

The Time-Sensitive services, in general, will follow the same forwarding schemes as the corresponding service types (Internet or LAN-Extension). However, the queuing for these services will be different on the backbone network to assure a dedicated bandwidth and QoS will be applied to these applications. A QoS profile has been reserved for these services on the backbone switches.

Layer 1 of the Ethernet protocol is a physical layer signal protocol for data communication over twisted pair. Layer 2 of the Ethernet is the MAC layer addressing and framing protocol, which indicates where to send the frames. The inventive network utilizes Layer 1 and Layer 2 elements of the Ethernet protocol throughout the various rings 30, 50 and for communication to and from the customer premises. The connectivity for the MAN services, for example, relies on layer-2 protocol switching functions.

The network uses native IP over the Ethernet, so that it will route all IP protocols. A Customer can connect directly to an E-POP switch, and traffic will be routed to the correct destination. In order to provide different QoS profiles, IP traffic can be sorted by either Destination IP address, Destination Subnet, or IP protocol (in the IP header). Traffic also may be discriminated based on layer 4 properties (e.g., port number). In one example, the sorted traffic is mapped to one of three QoS profiles. This sorting of traffic that ensures QoS metrics such as minimum guaranteed bandwidth and minimum latency can still be guaranteed to each Customer, even when other customers may be generating heavy Internet traffic or other heavy usage. Those skilled in the art will recognize that the network can easily support large numbers of such QoS profiles. For example, with current generation extreme switches, the network can support up to 8 different QoS traffic profiles.

The switches in the M-POPs and M/G-POPs on the backbone ring 50 implement limits on each customer's downstream communications through the backbone and access rings, to conform to the respective SLA. A customer's downstream, communication can also be limited by setting bi-directional rate limiting properties on the E-POP switches. Also, the switches on the backbone ring segregate and prioritize traffic on the trunk links. A customer's downstream communication can also be limited by E-POP bi-directional rate limiting properties on the E-POP switches.

At least in the upstream direction, the E-POP switches 33 throttle the customer transmissions in accord with the SLAs. For example, for a particular Internet service customer, the E-POP switch 33 serving the particular customer is provisioned to accept only a certain amount of upstream traffic, per unit time, on the port coupled to the Internet equipment of the particular customer. Packets received at a higher rate are dropped into a bit bucket. The two end points of a customer's communication might connect to the same E-POP, different E-POP switches on the same ring or different access rings. In any such case, SLM can throttle the customer transmissions in accord with the SLA terms for upstream as well as downstream. In the preferred embodiment, the service specifications for the customers may be purchased in increments as small as 1 Mb/s, from 1 Mb/s up to 1 Gb/s.

The switches also prioritize traffic by type and limit different types of traffic on the rings to support QoS and SLA requirements. Internet service is a Layer 3 service, using IP address routing at Layer 3. MAN service, utilizing VLAN techniques, is a Layer 2 service. Any time critical service is identified by a UDP port identifier, at Layer 4. The UDP port identifier identifies the particular application intended to receive the IP packets. Time critical applications have unique UDP port identifiers recognizable by the Juniper switches and BlackDiamond switches used on the backbone ring 50. Similarly, these switches identify Internet traffic based on IP addressing at Layer 3, and they identify MAN service frames by the presence of certain VLAN related information at Layer 2. Each switch on the backbone ring looks at the different layers of the IP and Ethernet protocol stack for the various frames of downstream traffic, identifies the traffic type classification for each frame, and places each frame into a respective one of four (or more) different queues corresponding to the traffic types.

The SLM perceives each physical ring as an aggregate of multiple logical rings. Each logical ring may occupy a certain set percentage of the total bandwidth available on the physical ring. For example, a network may be set to operate so that all of the Internet services, together, can utilize up to 50% of the bandwidth. All of the VLANs can use up to 20% of the bandwidth, collectively. All of the time critical UDP services, together, can utilize up to 20% of the bandwidth, and management traffic can use up to 10% of the bandwidth.

For traffic control from the M-POP to E-POP between M-POPs, the BlackDiamond switches in the M-POPs will receive traffic from the connected access ring as well as a portion of the backbone traffic. The QoS profiles on these switches are defined such that they can isolate the different traffic categories from each other to ensure that one service cannot affect the other services adversely. The QoS also should assign appropriate trunk bandwidth to each category of traffic.

In practice, when the respective switch places the exemplary four types of traffic into the respective queues, the switch sequentially reads frames from the queues for transmission over the next link in accord with an algorithm designed to implement the allotted bandwidth and priority. This makes each service modular and deterministic.

Network management communications in the inventive system utilize a standard network management protocol, preferably Simplified Network Management Protocol (SNMP) between network elements and OSS systems. SNMP-based management utilizes an SNMP manager, an SNMP agent, a Management Information Base or "MIB" and the SNMP protocol itself. The SNMP manager is an element of a network management system. An SNMP manager queries agents and receives responses, sets variables in agents, receives event reports from agents, and acknowledges those reported event. In the illustrated network, the NOCs and the SLM run SNMP managers.

An SNMP agent Stores and retrieves management data as defined by the MIB, provide information upon request from a manager and signal an event to a manager. An SNMP agent can reside on any networking device. In the illustrated network, every switch or router has an agent, running in the switch processor, that can return certain values as to status in response to standardized query messages. The agent also monitors operations of the switch or router and reports alarm conditions.

Management information is viewed as a collection of managed objects, residing in a virtual information store, termed the Management Information Base (MIB). Every agent has access to a database of values for each of the definitions written in the MIB for the managed device. A typical MIB contains the unique common name of each object, the value of the unique object identifier, and a textual description of the syntax and semantics of the object. Collections of related objects are defined in MIB modules. The management protocol, Simplified Network Management Protocol (SNMP), provides for the exchange of messages which convey management information. Specifically, the information is exchanged between agents in the managed objects, in this case the managed switches/routers, and the management stations or systems such as the NOCs and the service level manager.

With SNMP, operations can use a get-request, get-next-request, and set-request format. For example, the management system issues Get, GetNext and Set messages to retrieve single or multiple object variables or to establish the value of a single variable. In this manner, an SNMP manager such as a NOC or the SLM server can get a value from an SNMP agent in one of the switches/routes of the network. The managed agent sends a Response message to complete the Get, GetNext or Set. The managed agent may also send an Event Notification in an unsolicited fashion (without the need for a Request) by means of Trap messages. This enables the management system to identify the occurrence of conditions such as a threshold that exceeds a predetermined value.

The communications between the switches and the service level manager 100 preferably utilize these SNMP based communications. Certain communications between the NOCs 133, 135 and the switches also may utilize SNMP. Typically, the SNMP communications utilize portions of the transport capacity of the production network shown in FIGS. 2–4 (in-band), although some management communications utilize a separate out-of-band signaling capability described in more detail, later.

D. Service Level Manager (SLM)—Preferred Implementations

Figure 6:
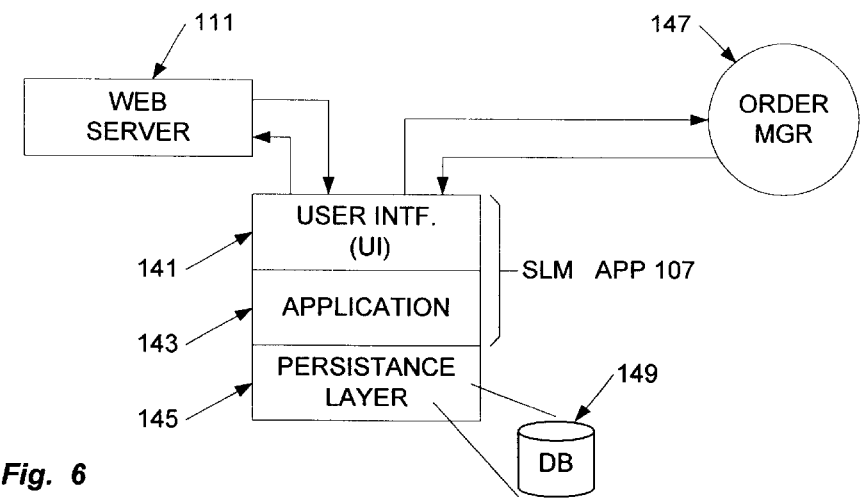
FIG. 6 is a block diagram useful in explaining the service level manager application structure and the interaction thereof with other elements of the operations support system, in accord with the invention.

FIG. 6 is an alternate illustration of the software implementing the service level manager. As shown, the SLM application in server 107 is implemented as a multi-tiered application, specifically one utilizing object-oriented programming, preferably as Enterprise Java Bean. For purposes of discussion at this point, the main function of the application 107 is to translate a provisioning request into management messages that the network understands. In the example shown in FIG. 6, the SLM utilizes three layers, 141, 143 and 145. The top-most layer is the user interface (UI) layer 141. This layer provides input and output functions, for example via the web server 111 and preferably via an order manager system 147.

The user interface through the web server 111 to the service level manager application 107 uses standard Internet protocols, such as HTML or XML over HTTP. The interface uses secure socket layer protocol, to prevent attack. The web server also implements a customer identification and password, to allow each customer to access the system for controlling only his or her own services. These same components provide access to the SLM for staff of the carrier operating the production network.

The middle layer is the actual software application 143. This layer provides the actual business logic. The user interface layer 141, the application layer and the persistence together form the SLM application 107.

The service level manager is written in Java, using enterprise Java beans (EJB). The various modules can run on different physical platforms. Also, it is possible to run multiple instances of each module in parallel. The topology database 149, for example, may run on different servers located in different regions. In such an implementation, the versions of the database in the servers are periodically synchronized.

The SLM application 143 is a multi-layered, modular, scalable, distributed, verifiable, data-driven, vendor independent, and platform neutral architecture that delivers unified service level management to the carrier's customers, partners, staff personnel and other operations support systems. The SLM application provides service layer and network management layer services, such as QoS monitoring/reporting and automatic bandwidth increases/decreases. The SLM application collects network and service related operations data from various agents, analyzes this data and transforms the data into accessible knowledge. In other words, the SLM application monitors the health of the network by analyzing semantic transparency and time transparency of data and control traffic through the network and provides the results of this analysis to various users, such as network service customers and network operations personnel.

The application layer 143 also accesses a persistence layer 145, with one or more associated databases 149. Based on data maintained in the database 149, the persistence layer 145 of the service level manager provides an understanding of the topology of the network. Preferably, the database 149 is a relational database of information about the network elements and the interconnection thereof in the particular network. The relational database 149 includes schema showing the relationship of ports to POPs, which E-POPs belong to which access ring, which M-POPs serve which access ring(s), and which M-POPs are elements of each backbone distribution ring.

The topology database 149 identifies network elements by classes of devices. In the currently preferred embodiment of the network, for example, the classes of switches include Summmit48 for E-POP switches 33, BlackDiamond for the M-POP switches 43, 45, 63, 65, and Juniper for the G-POP switches 73, 75. Addition of a new type of switch would only require adding a corresponding new class, for example, for a Riverstone switch, together with specific information about the configuration of each instance of the new switch in the actual network.

The database 149 includes static data about the network nodes, such as port interconnections between the switches and between E-POPs and end-use customers. In accord with an aspect of the invention, the topology database 149 (or another database) also stores dynamic network data relating to semantic and time transparency through the network. For example, for a given access ring 30, the database stores information indicating the allocations of transport capacity to the different types of services on the rings (e.g. NET and MAN services) and the extent to which the allocated capacities for each service are currently assigned to actual customers on the ring. These allocations and assignments change over time, for example as existing customers increase or decrease bandwidth subscriptions, as existing customers obtain new services or as new customer come on-line to obtain services, through the particular ring.

Figure 7:
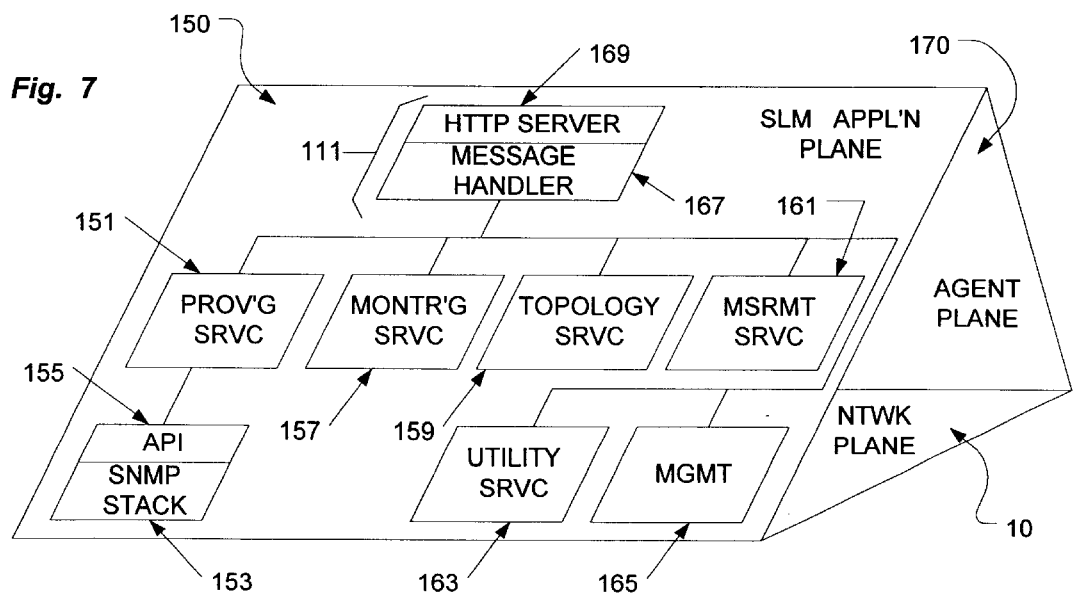
FIGS. 7 and 8 are block diagrams of the functions of the operations support elements in the service level manager plane and the agent plane, in accord with the invention.
Figure 8:
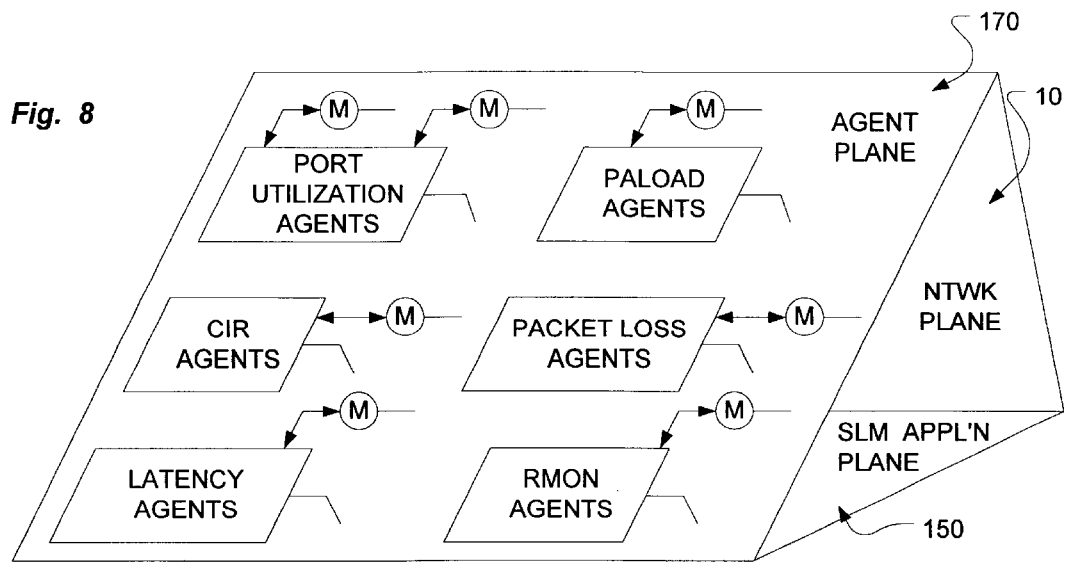

The network and its associated operations support systems/software may be considered as three separate but interconnected logical planes, as illustrated in FIGS. 7 and 8.

Essentially, the SLM application plane 150 sits on top of the network plane 10 (FIG. 7). The application has an understanding of the network topology. The SLM application plane 150 collects data from various agents in the agent plane 170, and it populates one or more databases with collected information about network operations. The SLM application plane 150 has the business logic that works on the database, and through its user interface provides requested information about the health of the network to customers and to network operations staff.

The SLM application plane 150 actually includes a number of components, as shown in FIG. 7. One of those components offers a provisioning service 151. Essentially, this module receives requests, for example, to increase bandwidth, decrease bandwidth, activate a port, deactivate a port, initiate service, stop service, etc. The Provisioning Service module 151 is implemented as an Enterprise Java Bean. This module passes on information to the SLM SNMP service module via a well defined API. The SLM SNMP service translates it into an SNMP message and submits the information to the relevant device in the network plane equipment (e.g., Summit 48 or BlackDiamond). For this purpose, the Provisioning Service module 151 uses an associated SNMP Protocol Stack 153 with a Java based API 155.

The monitoring service module 157 periodically captures data from the network agents, for example, from the latency agents, and updates dynamic data about the network operations. The topology service module 159 understands the topology of the network and the scope of the various services through the network. Essentially, in the planar view, these modules 157 and 159 serves as the persistence layer 145, whereas other modules such as the modules 151 and 161 serve as the application layer 143 (FIG. 6).

The measurement service module 161 looks at the raw data from various monitoring devices, as accumulated by the monitoring service 157, and creates new data for presentation to the users. The measurement service module 161 also is implemented as an Enterprise Java Bean. The main function of this component is to execute algorithms, using the raw data collected by various agents, and to store the results. This service, for example, periodically or upon request measures available bandwidth on an access ring and updates the Ring Object Entity (e.g., a Ring Table in the Oracle 8i database). As another example, if a latency agent 127 measures latency over two or more different network legs that effect a given customer, the measurement service module 161 combines those latencies into a customer-centric report of the latency impacting that customer's service.

As discussed relative to FIGS. 1 and 6, there are one or more databases that operate below the SLM application layer software. One database stores the topology information, such as which switch is in which POP and which port serves which customer, for the topology service 159. The same or a separate database also stores raw data, such as the latencies, etc., derived from the monitoring service 157. The monitoring service module 157 periodically captures data from the network agents, for example, from the latency agents, and updates the dynamic data for the relevant elements in the topology database. The measurement service module 161, in turn utilizes this raw data to compute desired dynamic performance metrics, and this additional dynamic information is stored in the same or another database.

The utility service 163 performs support functions. For example, this module moves files, e.g. from the database to the measurement service module 161 or to the web server 111. The utility service performs graceful shutdown and restart, sending of keep-alive messages, scheduling, prioritization and stacking of incoming requests for later or on-demand prosecuting, etc. The management service module 165 provides the actual management communications to and from the actual elements on the network plane 10.

The service level management application plane 150 also includes the elements forming the web server 111. This drawing shows the web server 111 comprising a message handler in communication with the other elements on the SLM application plane 150. An HTTP server 169 provides to-way communicates with a user device implementing a standard browser application.

The network plane 10 (FIGS. 7 and 8) consists of the carrier's network and the Public Internet. The carrier's network consists of the multi-regional IP over fiber-transported Ethernet network (FIGS. 2–4), an Out of Band Management Network, any Inter Regional Network the carrier may deploy, or any other network that the carrier has the right to monitor, manage and control.

As noted, the SLM application plane 150 monitors and controls elements in the actual network plane 10 through a number of agents. These agents logically form another plane, 170. FIG. 8 shows representative examples of a number of such agents in the plane 170.

The agent plane 170 consists of special purpose hardware and software components used to monitor, manage and control the health of the network and its services. This domain is composed of Agents that reside in the POPs, and the managers that these Agents report to. In short: the Agents report to their respective managers (M), which in turn communicate with SLM Services. A representative sample of the different agents that may be used appear in this drawing, however, not all agents are shown in the Agent plane 170 (for example: topology detection agent, resource utilization agents, etc.). Although not all shown in FIG. 8, certain other specific agents of particular significance are discussed in more detail, later.

E. Order Manager

As shown in FIG. 6, the service level manager also interfaces to an order manager 147. The order manager (OM) 147 enables the end-to-end processing of business processes by executing a variety of Service Order and Work Order messages. The Order Manager is a suite of components that automate the ordering processes. The main function of this module is to execute Orders submitted by members of the functional groups, keep track of the progress of the different types of Orders that members of functional groups submit to the service level manager, automate hand-off among various service level manager components, and inform members of the functional groups of the status of the Orders.

Figure 9:
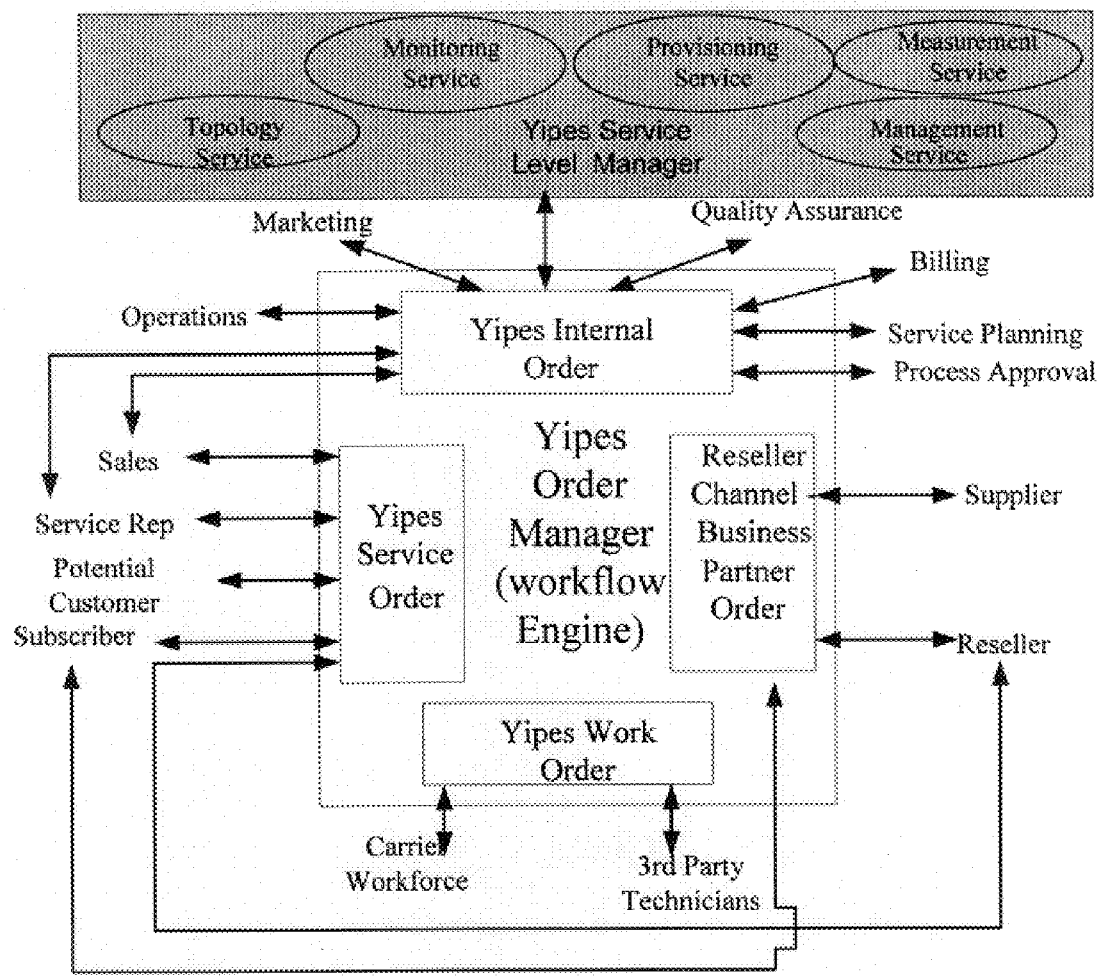
FIG. 9 is a combination block diagram and flow chart, illustrating the flow of information and the processing of order messages within and across the order manager.

FIG. 9 illustrates the flow of information and the processing of Orders (messages) within and across the OM. Orders can be XML documents or the like. As shown, Orders go through a finite number of states while being processed by the OM. A state transition can be triggered by external and internal stimuli. The processing of one type of Order may result in the generation and execution of other types of Orders.

The Order Manager handles four or more types of Orders. The execution of an Order corresponds to the operation of an Extended Finite State Machine. The first type of Order is the Service Order. A Service Order message is exchanged between the OM and a member of Sales, a Service Representative, a Potential Customer, or a Subscriber group. Service Orders contain service and end-user specific data, such as service delivery address, service delivery due date, service class, and end-user name. The execution of a Service Order usually results in generation and execution of other types of Orders listed below.

The second type of Order is the Internal Order. The majority of Internal Order messages are exchanged between OM and a member of Marketing, Billing, Service Planning, Network Planning (not shown in the figure), Quality Assurance and Control, Process Approval, Field Operations, or Sales group. Other Internal Order messages are used for interaction among service management systems (e.g., between order manager and the service level manager).

The third class or type of Order is the Work Order. Work Orders are used by the carrier to dispatch and assign work to outside contractors and the carrier's own field technicians; and to track work performed by these entities.

Orders in a fourth class, that is to say the Business Partner Orders, represent messages that are exchanged between the OM and the carrier's e-business partners.

F. Customer Interface—Reports and Service Changes

As outlined above, the service level manager 100, through its associated web server 111, provides an interface for customers who obtain service via the network. The web interface for a particular customer, already receiving service through the network, offers several report options. For example, if the user selects "latency," the web server 111 will output a graph showing the latency for that customer's service over some period of time. The latency information is accumulated in a database by latency monitoring agents 127 placed in the network (see FIGS. 3 and 4). The measurement module 161 (FIG. 7) computes the report statistics for the particular customer from the raw data from these agents. If the user selects "usage," the web server 111 will output a graph showing the number of bytes going in and out through the customer's port(s) over a period of time. Usage data is gathered by SNMP monitoring agents, RMON agents, and/or intelligent sniffers.

The user interface also offers interactive options to change specific customer services. For example, if the customer selects an option to increase bandwidth, the web server 111 supplies a corresponding request message to the SLM application 107 (FIG. 6), that is to say to the provisioning service module 151 (FIG. 7). The request includes an identification of the customer. The provisioning service module 151 accesses the topology service 159 to determine the scope of that customer's service. The topology service 159 accesses the topology database 149 (FIG. 6), to obtain information about the customer's service. This information, for example, may include the identification of the customer's port, the current bandwidth provisioned on the port, the maximum port speed and bandwidth available for the particular type of service on the access ring serving the customer.

From this information, the provisioning service module 151 determines the maximum amount of increased bandwidth that the network can offer to the particular customer and sends that data back to the web server 111 for presentation to the customer. The provisioning service module 151 also reserves the resources to provide the offered bandwidth.

The customer then chooses how much of the bandwidth to purchase, and the web server 111 supplies the specifically chosen amount to the provisioning service module 151. For example, the SLM application in plane 150 may offer the customer an increase up to 100 Mb/s in total bandwidth. The customer currently subscribing to 25 Mb/s, however, may opt to purchase only an additional 25 Mb/s, that is to say a total of 50 Mb/s bandwidth.

In response to the choice by the subscriber, the provisioning service module 151 instructs the management module 165 to allocate reserved resources to the particular customer's service. In response, the management module 165 instructs the agent(s) in the effected switch(es) to make the necessary configuration changes to provide the increased bandwidth service for the port(s) of the particular customer. For an upstream bandwidth allocation, this entails setting the subscriber profile for the customer's port to the new maximum bandwidth (50 Mb/s bandwidth in our example), in the E-POP switch 33 serving the particular customer. For downstream bandwidth allocation, this entails setting the subscriber profile in the M-POP switches 43, 45 for the customer's address and the particular type of service (e.g. Internet service). The upstream bandwidth also may be limited by setting of the subscriber profile on the M-POP switches. Whether the SLM instructs the E-POP switch or the M-POP switch, etc., to assign certain parameters in the subscriber profiles depends on the scope of the customer's service as well as down vs up stream.

The provisioning service module 151 informs the topology database 149 of the specific allocation of resources, to enable updating of the table entries/profile data associated with the customer's service. The provisioning module 151 also releases any additional resources that were reserved but not needed to meet the actual choice or selection of increased bandwidth by the customer.

The inventive network offers several categories of services, such as Gold, Silver and Bronze services. The Gold service is a fully guaranteed bandwidth service, with respect to bandwidth and other parameters such as packet loss. This service can usually be offered only in a controlled and predictable environment, for example where the scope/boundaries of the service are within one of the regional networks operated by the carrier, i.e. the services does not span the public (unpredictable) Internet. The Bronze service is only a 'best-efforts' service. In one example, a customer may normally have only a Bronze service. However, at a certain hour of the evening the customer normally downloads critical data, for example, financial information between bank branches. At the time of file transfer, the customer wants all services between locations to be Gold services. The service level manager can change the priority associated with the customer's service from low to high at the start of the period and back to low at the end of the period, to provide the Gold service during the desired interval. The service level manager will provide the appropriate instructions to the switches carrying the customer's services, at the appropriate times.

This may be pre-programmed to occur at set times. Alternatively, the customer can come in through the web server 111 and increase priority at the desired start time and decrease priority at the end of the file transfer interval. Each time that a change is made, the service level manager 107 knows the paths to/from the customer locations and the allocation of resources through the effected switch nodes. The service level manager 107 determines that it has the resources to satisfy the desired change in conditions, priority upgrade or downgrade; and it allocates the appropriate resources. Then the management module 165 provides instructions to the switches to implement the allocations, including any necessary changes in bandwidth reservations and the changes in priority status for the customer's traffic. The tables in the topology database are updated each time that the customer's service changes.

These changes, however, do not require instructions to every switch along the path to or from the customer. Because the topology database 149 indicates the actual topology of the network, the service level manager 107 actually knows which of the nodes along the path need to be changed. For example, it may be necessary only to change the profile associated with the customer's port in the E-POP 33 serving the customer's location, to accept a different bandwidth and assign a different priority to the traffic.

G. Metrics of Network Operations—Health

There are two general classes of health related information that are of interest, time transparency and semantic transparency. Time transparency means that transmission of data between two points of the network is completed in accord with certain time parameters. Parameters relating to time transparency for different types of network traffic include transmission time, delay, differential delay or 'jitter,' and the like. Voice over IP traffic, for example is highly susceptible to jitter, whereas a file transfer operation is not. Semantic transparency means that the network is "transparent" to the transmitted data and does not introduce more than some minimal amount of errors in the transmitted information content. Parameters relating to semantic transparency include bit error rate, frame or packet discard rates, and the like. Different types of traffic through the network require different degrees of semantic transparency. Voice over IP traffic, for example can tolerate some degree of error due to packet loss, whereas the file transfer operation may not. The inventive operations support systems use various techniques to monitor several significant metrics relating to each type of transparency.

SNMP Port Utilization reports provide a measure of the traffic (i.e., in bytes) that leaves or enters a node. To achieve this, an SNMP manager (e.g., Concord Health) periodically sends SNMP GET Requests to the SNMP agents that reside in the network nodes (e.g., routers, switches) and requests a number of bytes that were sent or received on a particular interface (e.g., port serving a customer on an E-POP).

Device Availability also is calculated by the SNMP manager (e.g., Concord Health), which periodically requests data from agents that reside in the various nodes.(e.g., routers, and switches). Device and application availability are calculated using a combination of SNMP and ICMP messages. An example of an Availability report is one that calculates the percentage of time that nodes in a particular region or ring were up during a 24- hour sampling period.

The inventive network may also utilize 'RMON' monitoring or probe type equipment as a form of special agent for traffic analysis. The Remote Monitor Protocol (RMON) is a set of software and hardware specifications designed to facilitate the monitoring and reporting of data traffic statistics in a local area network (LAN) or wide area network (WAN). RMON defines an independent network probe, which comprises a separate CPU-based system residing on the monitored network.

According to the original RMON standards, a special application program, sometimes referred to as an RMON Manager, controls the operation of the RMON probe and collects the statistics and data captured by the probe. An RMON agent, for example, is shown in FIG. 8. The manager may be implemented as another database and exactor, similar to those discussed above relative to FIG. 1. In order to track network traffic and perform commands issued to it by the RMON Manager, the RMON probe or agent operates in a promiscuous mode, where it reads every packet transmitted on network segments to which it was connected. The probe performs analyses or stores packets, as requested by the RMON Manager.

The RMON probes and manager automatically track network traffic volume and errors for each MAC address seen on a segment and can maintain a Host Matrix table of MAC address pairs that have exchanged packets. The RMON system can also track the traffic volume and errors associated with those address pairs. RMON further permits the collection and maintenance of historical network performance metrics, for example, for trend analysis and proactive performance monitoring. A newer version, RMON2, offers the capability to monitor packet information at the network header layer (layer 3), as well as encapsulated information for layer 4 up through the application layer (layer 7). However, this higher layer monitoring is limited to a number of commonly used protocols and applications, such as the Internet protocol suite (IP and UDP) and Internet applications (FTP, Telnet, TCP and SNMP).

Certain aspects of the invention relate to an enhanced technique for traffic analysis. That preferred form of traffic analysis is described in detail in a later section.

The regional networks 90 represent network environments under the control of the carrier. As such, operations support equipment of the carrier can monitor and maintain the health of those network environments to meet the customer and traffic requirements time transparency and semantic transparency and thereby to meet the service level agreements with the customers. The public Internet 87, between the regions 90, however, represents one or more environments that are outside the control of the carrier.

The carrier itself signs service level agreements with its Internet Service Providers (ISPs). Those agreements specify certain performance metrics relating to delay and error rates through the ISP networks. The carrier operating the regional networks 90 can monitor the performance of the communications between the regions, through the Internet 87, and combine the agreed and actual information with information about the health of the regional networks to provide overall performance information. For example, if the round trip delay for network transport between the regions $90_1$ and $90_2$ through the Internet 87 is 50 ms, and the carrier predicts round trip delay across any region is at most 80 ms, the carrier can take those two numbers into account when it sets-up its SLAs with its customers. Such latency measurements are discussed in more detail below 1. Latency Agents In addition to the SNMP agents in the switches/routers and the RMON agents, the inventive network management methodologies utilize a number of other specialized agents. One such agent is a latency agent. Preferably each of the regions 90 includes one or more latency agents 127, although only two, in the regions $90_1$ and $90_2$ are shown for convenience (FIG. 3).

FIG. 4 shows one example of an implementation of a latency agent 127. In this implementation, the agent 127 is a software module running on a separate computer connected to a 10/100 baseT Ethernet port of one of the switches 43 in the M-POP 41 at the juncture of an access ring 30 to the regional backbone distribution ring 50. Such an agent could connect to any of the switches of the network where there is an available port at a convenient location, and typically a number of such agents 127 are scattered among the different regions 90 (FIG. 3). The related aspects of the invention also encompass implementation of the latency agents in software running in the appropriate network switches/routers.

The latency agents 127 collect data that is relevant to latency of communications through the network. Essentially, the latency agents 127 use Internet Control Message Protocol (ICMP), which provides an echo function for sending a packet on a round trip between two hosts. With this function, an agent can "Ping" any remote device having a known IP address and measure the round trip time until receipt of a response message. From periodic pinging operations, it is possible to compute average round trip times as indications of network latency as well as packet loss percentages.

The latency agent 127 $_1$ in region $90_1$, for example, can ping the G-POP router 73 or 75 in region $90_3$ to learn the round trip delay time for packet (layer 3) transport from the M-POP router 43 or 45 at the head of an access ring 30 to and from the remote region $90_3$, via the regional network $90_1$, and the public Internet 87. As another example, the latency agent 1272 in region $90_2$ can ping the G-POP router 73 or 75 in region 904 to learn the round trip packet delay for (layer 3) transport to and from the remote region 904, via the regional network $90_2$ and the public Internet 87. Either of the latency agents $127_1$, $127_2$ can also ping devices on the public Internet, such as the server 129. The latency agents 127 can send ICMP pings to any other device having a known IP address, including customer devices, switches in the regional networks 90 or any independent device 129 on the Internet 87.

In the inventive network, the latency agents 127 are programmed to continuously periodically ping certain selected destinations in the network and collect the round-trip delay and report this data to one or more of the management systems of the network, such as the NOCs 133, 135 and/or the service level manager 100. If a customer reports a problem involving excessive delay, the management systems can instruct a latency agent 127 to run specific delay tests to determine the network elements causing the delay.

The latency agents 127 also measure latency to and from a domain name server (DNS). For this purpose, a latency agent 127 in each region 90 will from time to time launch a DNS query to one or more DNS servers. The latency agent may check the DNS translation time for DNS servers (not shown) within the regional networks 90 or for DNS servers such as the server 131 on the public Internet.

The latency agents 127 also identify and report latency violations. If n consecutive time measures for a particular remote IP address or DNS translation exceed a respective threshold value, the agent will transmit an SNMP trap message, so as to report the event as an alarm to one or both of the NOCs.

The preferred embodiment of the latency agent 127 uses a device and service level manager software by Jyra Inc. Other vendors offer similar monitor products, and it is within the scope of the present invention to incorporate the latency agent into the software of the particular switches, for example, into one of the M-POP switches 43, 45, 63 or 65. At present, the latency agents are implemented at the M-POPs. It is preferred, in future, to implement these agents at the E-POPs. In some cases, the latency agents also may be implemented at customer premises.

Of particular note, the latency agents 127 in the various regions are programmed to ping the G-POP routers for all of the other regions. In this manner, the agent $127_1$, in the region $90_1$, will measure the latency for IP packet communications to and from the other regions, $90_2$, $90_3$ and $90_4$ in our example. Similarly, the agent $127_2$ in the region $90_2$ will measure the latency to and from the other regions, $90_1$, $90_3$ and $90_4$. Latency agents (not shown) in the other regions $90_3$ and $90_4$ will measure the latency of communications to between those two regions and to and from the other regions $90_1$, and $90_2$ In this way, the latency agents determine the inter-region latencies between the regions 90 from the perspective of each particular region.

The inter-regional latency measurements indicate the performance of the Internet 87. The carrier operating the regional networks 90 can use this information to verify that its Internet service providers (ISP) are in fact delivering service in accord with the parameters of the service level agreements that the carrier negotiated with its ISPs.

The latency agents 127 also ping the various POPs within the respective region to determine intra-regional latencies. For example, a latency agent $127_1$, coupled to an M-POP switch 43 can ping E-POPs 33 in the sub-tending ring 30 as well as the M-POPs 41 and E-POPs 33 in other access rings. The latency agent 127, also can ping the switches 73 and 75 of the G-POP within the regional network $90_1$. From these pinging operations, the measurement module uses data from the latency agent $127_1$, to compute average round trip times for the various intra-regional communications.

The latency agents are actually capable of computing latency reports from the collected data, for inter-regional delays and for intra-regional delays. In the preferred implementation using the Jyra service level monitor as the latency agent, the latency agent creates these reports as Java applets. The latency agent sends these reports to the service level manager 100, which effectively posts those Java applet reports through the web server 111, for access by customers as well as by network operations personnel.

The latency reports can be specifically tailored to the service for a particular customer. For example, a customer in region $90_1$, might be interested in delay to/from the remote region $90_3$. The agent $127_2$ in region $90_1$, normally reports the inter-region delay. That agent also measures the latency for communications to/from the E-POP 33 serving that customer in region $90_1$. The report for the customer posted on web server 111 includes the total of these two latencies, that is equivalent to the latency between the respective E-POP 33 serving that customer in region $90_1$, and the remote region $90_3$.

In addition to the routine reports, the latency agents report alarms to the NOCs. Also, the latency agents can be instructed to initiate special tests and report results to the NOCs.

2. Availability

Other metrics that are compiled through the monitoring service of the SLM relate to availability. One availability metric is network availability. For this purpose, the SLM periodically queries SNMP agents in the various switches as to how long each has been up and running (vis-a-vis the last time that a switch was down, so as to interrupt network services). In addition, SLM uses ICMP control messages, e.g., Echo. From the resulting run-time data, the monitoring service can calculate percentage values representing the amount of time that network devices, applications and services were operational over some given interval. In an initial implementation, the Network Health software from Concord Communications compiles the network availability data, for storage in one or more of the databases in the service level manager 100.

Increasingly, the data network carrier needs to be able to bill for differentiated services, for example, for providing different QoS and/or different guaranteed data rates. To consistently bill for such differentiated services, the carrier needs to be able to prove that the network was up and carried the customer traffic during certain periods and carried measured amounts of traffic, to answer any customer questions about network availability and delivery of the differentiated services in accord with the SLAs. The SLM uses Concord Health to monitor and report on the number of bits/bytes that pass through a port. This provides statistics for raw data measurement. To measure and report on application-specific usage (e.g., what was the % of FTP traffic that went through the port) the SLM uses a Narus analyzer and device specific reporting capabilities such as Netflow, LFAP, etc. The reports are available through the web server 111.

Another availability metric relates to service availability. This involves intelligent monitoring of the frames or packets for the different types of service through the network. Periodic interruptions in flow of different types of traffic show the times when the network is not available to support the specific service-oriented traffic.

A closely related metric is reachability. The inventive service level manager 100 determines reachability by periodically pinging customer destinations from the latency agents 127, to determine if the network can in fact reach each customer. Each successful ping to a destination shows that there is a route available to that destination through the network and that the destination was capable of responding.

3. Topology Detection

In the presently preferred embodiments, the latency agents 127 can also be used for topology detection, particularly for layer 3 services such as the NET service. For this purpose, the agent 127 is instructed to perform a trace route operation to and from a given destination. The trace route operation provides latencies on a hop-by-hop basis between the agent and the identified destination. In the inventive network, the latency agent performs a trace route operation on one leg going from its location to the boundary of the regional network, and it performs a trace route operation on one leg going from its location to each customer location. The latency agent could be at the customer premises or in the E-POPs. In the exemplary network, the latency agents 127 are coupled to the M-POP switches.

In the example of FIGS. 3 and 4, the latency agent 127 performs trace route operations on one leg going from its location at the M-POP switch 43 to each of the G-POP switches 73, 75 within the same region 90 (see FIG. 3). For this purpose, the latency agent 127 would launch ICMP queries addressed to the switches 73, 75 at the boundary of that regional network. The agent 127 determines the path based on addresses of the switches along the path that respond and determines the latencies for each hop, of the legs going to the G-POP switches around the backbone distribution ring 50. The same latency agent launches ICMP queries to customer equipment 31 at the various customer locations served through the access ring 30, to perform trace route operations on each second leg going from its location to a respective customer location. The agent 127 determines path and the latencies for each hop, of the legs going to the customer equipment around the access ring 30.

The scope of the customer's service, derived from the trace route information, is stored in the database. From this information, the database indicates the path and the latencies for each customer's services, that is to say the nodes along the links through the network carrying the customer's traffic and the current latency over each link. The database also indicates the reachability of the customer's equipment and the intended destination, such as the G-POP serving as the boundary of the regional network for Internet access services. From the accumulated trace route information, it is possible to identify links on the rings that are under utilized or over-utilized. The database also indicates the allocated capacities on those various links, for example, to allow allocation of additional resources on each link to a customer requesting an increase in bandwidth.

A layer 2 service, for example a Virtual Private Network (VPN) service such as the inventive MAN service, appears as a logical switched circuit through the network. The network devices have access to such a logical circuit only at layers 1 and 2. This means, for example, that the latency agents and traffic analyzer agents on the network can not access layers 3 and higher for the data carried on such circuits. The trace route function discussed above works with layer 3 information, for example, as used in the NET service. However, a different technique is used to learn the network topology or scope of a customer's layer 2 MAN service.

In the inventive network, the switches implement the layer 2 MAN service using virtual local area network (VLAN) techniques. Essentially, a VLAN is defined to connect all of the customer sites to support this service, based on layer 2 switching through the network nodes. Frames for customer VLANs are tagged, in accord with Ethernet 802.1 Q, with data identifying the particular VLANs. In general, in a VLAN mode of operation, data switches transport frames (encapsulating packets) back and forth between terminal stations designated as members of a particular VLAN. However, the switches of the network do not transport the packets for the VLAN members to any other terminal stations.

Essentially, the SLM queries the agents in the individual switches to learn which ports on each switch support a particular VLAN tag, it is possible to identify the links and ports that frames/packets for each particular VLAN or MAN service pass through. This information represents the scope or topology of each customer's MAN service. Although this will not directly determine the latencies effecting the layer 2 service, it is possible to estimate latencies from the layer 3 latencies determined along the various legs of the network for layer 3 services. The layer 2 services will also encounter latencies the same as or lower than those encountered for layer 3 services, and typically, the actual layer 3 latencies are somewhat lower than the latencies measured by the pinging operations described above.

4. Preferred Traffic Analysis

There are also situations in which the carrier desires or needs to know detailed information about the type of customer traffic on the network. For example, the data network carrier needs to be able to bill for differentiated services, for example, for providing different QoS and/or different guaranteed data rates. To consistently bill for such differentiated services, the carrier needs to be able to prove that the network was up and carried the customer traffic during certain periods and carried measured amounts of traffic, to answer any customer questions about network availability and delivery of the differentiated services in accord with the SLAs. The Concord Health reports through the web server show the customer and/or the carrier staff how many bytes went in and out through a particular port, e.g. to and from a particular customer location. The RMON agents provide some further traffic-related report data. Also, some of the existing agents, e.g. in the switches, can provide statistics as to the flow of general classes of traffic through the various ports, however, this information is still somewhat limited. Here the type of traffic differs at layer 3, layer 4 and above. To achieve the desired monitoring, the inventive network includes additional agents, in the form of traffic analyzers 128 that are session aware and preferably are application aware. Hence, this monitoring involves analyzing customer traffic data all the way up to application layer 7, if appropriate.

FIG. 4 further shows one example of an implementation of a session aware traffic analyzer 128. In this implementation, the analyzer 128 is a software module running on a separate computer. The presently preferred embodiment of the traffic analyzer uses one of several hardware-based analyzers available from Narus, of Palo Alto, Calif. For management communications purposes, this computer of the analyzer 128 connects to a 10/100baseT Ethernet port of at least one of the switches 45 in the M-POP 41 at the juncture of an access ring 30 to the regional backbone distribution ring 50. The analyzer 128 also connects to another port on the switch, for receiving data for analysis. For example, if the analyzer is intended to monitor giga-bit Ethernet traffic on one of the rings, then the analyzer 128 also connects to a giga-bit Ethernet port of the switch 45.

The analyzer 128 could connect to any of the switches of the network, where there is an available port at a convenient location. Typically many such agents analyzers are strategically placed throughout the different regions 90 (FIG. 3) to allow the carrier to monitor customers Internet access (NET)

traffic and other layer 3 or above traffic. The related aspects of the invention also encompass implementation of the traffic analyzer in software running in the appropriate network switches/routers.

The traffic analyzer 128 essentially acts as an intelligent sniffer, examining, filtering and condensing out useful information from the traffic on a particular link or passing through a particular port. For this purpose, the traffic analyzer connects through the switch so as to "listen" to all data traffic going in and out through a designated network port. In the example of FIG. 4, the analyzer 128 and switch 45 might be configured to allow the analyzer 128 to listen to all of the traffic on the link 39 going to the first E-POP switch 33 (directly above in the drawing).

The analyzer 128 reviews information at layer 3 and above to identify session related information and compress the data stream down to a manageable level. Specifically, the analyzer provides compressed data sufficient to identify certain session related parameters. The session related information culled by the analyzer is approximately 1% of the data received and reviewed by the analyzer (1:100 compression ratio). The analyzer provides this compressed information to an appropriate manager, for example, to a database 117 in the SLM 100 (see FIG. 1). The manager, such as the Narus extractor 115, processes the data to form IP detailed records (IPDRs). An IPDR, for example, includes session start time, end time or duration, source IP address, destination IP address, type of payload data, layer 4 port ID, number of bytes communicated, and the like.

The manager in turn can supply the IPDRs to any other operations support system. For example, the SLM 100 can provide the IPDRs to a billing system, to compile bills and maintain archival records of customer traffic to support the carrier's billing operations.

Initially, the analyzer is session aware, as outlined above. Preferably, the analyzer 128 is application aware. For example, the analyzer 128 can parse the data to enable detection of application specific information, such has the URLs accessed by a customer of a NET service or how much of a customer's traffic is e-mail or e-mail attachments. The application aware implementation may also allow the network to adapt the customer service to the detected application, for example, to increase bandwidth dynamically at the detected start of a file transfer protocol (FTP) session or to provide a guaranteed bandwidth with minimum jitter dynamically at the detected start of a voice over IP session.

H. Network Operations Centers (NOCs)

Figure 10:
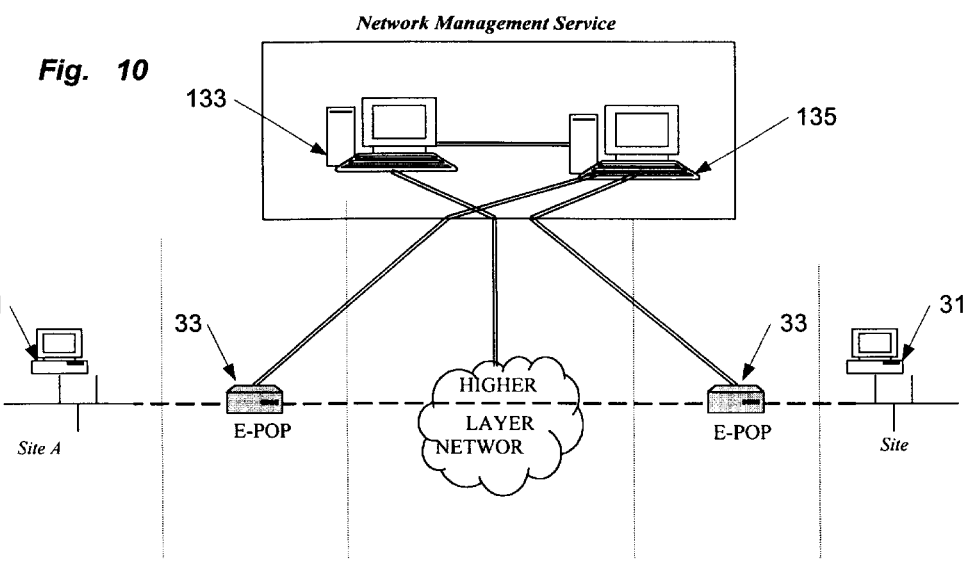
FIG. 10 a simplified block diagram of the network showing the interconnection of two network operations centers with actual elements of the network.

As part of the operations support, there are preferably two types of Network Operation Centers (NOCs) 133 and 135 (see FIGS. 3 and 10). The first NOC 133 provides fault management of the backbone. The network typically includes a number of the NOCs 135, in some of the different regions. The NOCs 135 manages all three levels: Access, Distribution and Core. The first NOC 133 is responsible for maintaining the core IP links between metropolitan regions 90 (FIG. 3). The second NOCs 135 maintain the edge network devices and routers serving a given metropolitan region 90. These two tiers of NOCs work co-operatively to ensure the highest network availability. The primary functions of Network Operations Centers are:

Fault Management
Accounting Management
Configuration Management
Performance Management
Security Management FIG. 10 provides a functional block diagram showing the interconnection of the two NOCs 133 and 135 to the actual network elements. The second NOC 135 uses a base platform, which includes HP OpenView and Micromuse NETCOOL®/OMNIbuS™, to provide a state-of-the-art IP network management. The platform incorporates artificial intelligence capability that can verify and filter network events. This feature analyzes alarms and presents the NOC personnel with the specific problem to investigate, along with complete information about the problem from data collected.

The communications between the NOCs 133, 135 and the network elements may utilize in-band transport, that is to say signaling riding in the data stream(s) of the transport network itself. However, it is preferable that the carrier operates an out-of-band signaling network to carry at least some of the maintenance and operations traffic, as discussed in the next section.

The server(s) running the elements of the service level manager 100 may reside in one of the NOCs 133, 135 or anywhere else that is convenient. The NOCs, however, do have access to the stored information and the monitoring and control functions of the service level manager 100. Some information is made available to customers through secure access to the web server 111. Also, the web server interface offers customer access to control and/or change their network services, and the service level manager 100 will automatically implemented desired customer service changes. The NOC user interface to the SLM 100 allows staff personnel similar access to customer-specific information and to service control functions.

I. Out-of-Band Management

The communications between the NOCs and the SLM and the various network switches, agents and monitoring devices will utilize some in-band transport, that is to say over the same network links as the customer traffic, for example, for transport of the SNMP communications discussed above. Network equipment configuration management communications often involve an IP/Telnet session. Although these sessions could also use the production network 10, disruptions to the production network could make connecting to the equipment through in-band telnet impossible. Accordingly, it is preferable that there is an alternative method of connecting to each network element. Preferably, the inventive operations support functions utilize an out-of-band (OOB) network for at least some management signaling traffic.

Out of Band Management implies that a separate network that is invulnerable to disruptions in the production network is used to connect to the carrier's equipment. The typical scenario for this type of network is that a separate network of routers is maintained. Each of these routers contains hardware that allows it to connect to the console port on the production equipment. Since the console port does not use the IP protocol or even Ethernet to communicate with the Out of Band (OOB) network router, the production and OOB networks are totally independent. Therefore to lose all connectivity to production equipment would require the simultaneous failure of two independent networks.

For this purpose, OOB routers in each region are connected to a separate WAN that is owned and maintained by a different carrier and does not run through any of the production network that carries the actual customer services traffic. The primary goal of the OOB WAN is to provide connectivity for configuration and fault management of the agents in the various POP switches. Further back-up is provided through the public switched telephone network (PSTN). Other management traffic may utilize the OOB WAN network and/or the PSTN, such as communications to and from the latency agents 127 and/or the traffic analyzers 128.

Figure 11:
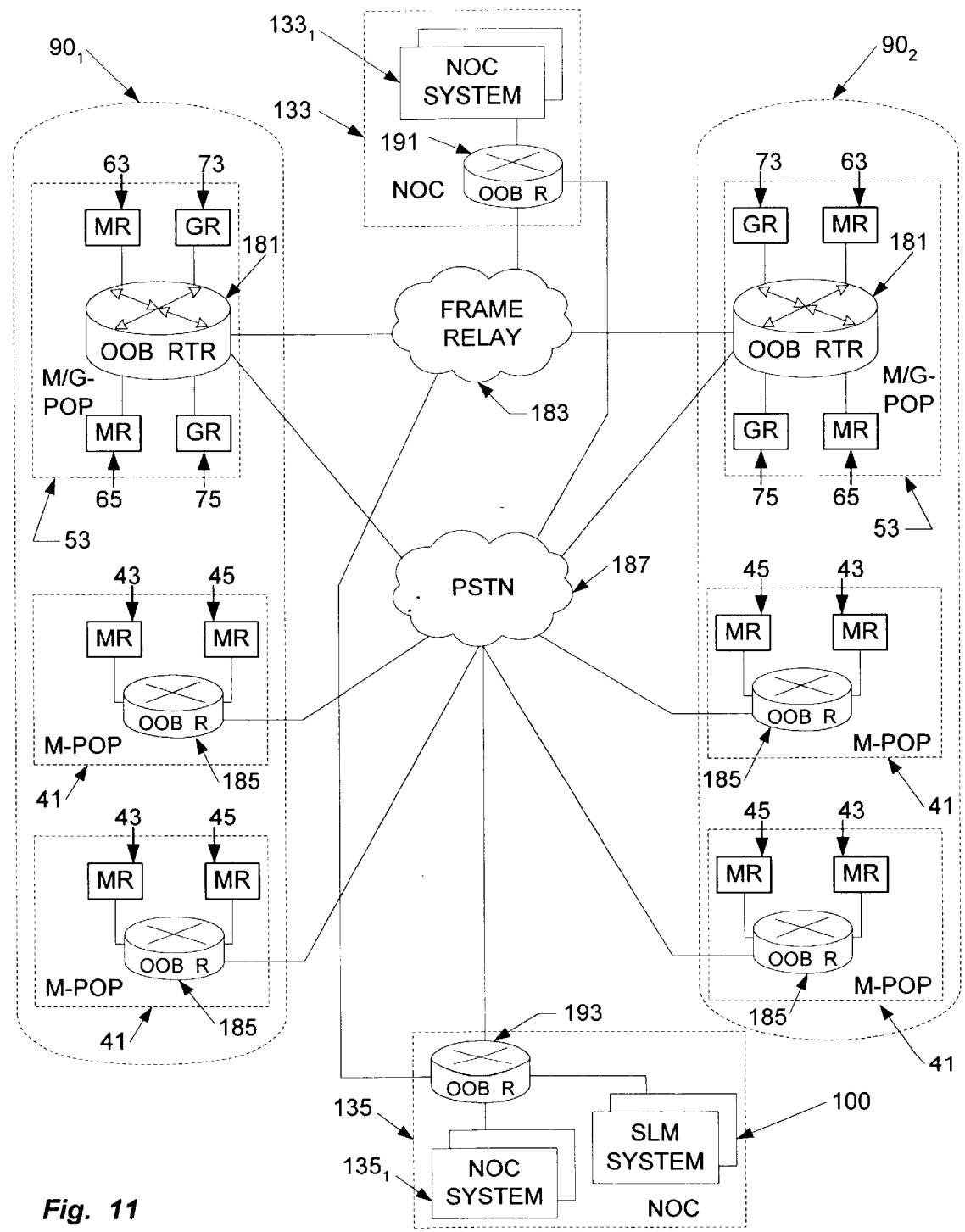
FIG. 11 is an alternative illustration of the network, showing the interconnection of certain network nodes and the operations support systems through independent networks, so as to provide out-of-band management capabilities.

FIG. 11 is a functional block diagram of a portion of the network, with particular emphasis on the OOB networking. This drawing shows just two of the regional networks 90, in this case the networks $90_1$ and $90_2$. For each regional network 90, the drawing shows a number of the routers having out-of-band connections to the NOCs 133, 135 and the service level manager (SLM) 100. The backbone and access rings of the production network, that is to say the rings carrying the actual customer service traffic, have been omitted here for simplicity of illustration.

The OOB management design varies for each type of POP. Since most critical equipment with the potential to affect the most customers is located in the G-POP or M/G-POP, the highest level of accessibility is provided for components that reside there, so that this equipment can be reached for troubleshooting with a high degree of confidence. The equipment in the M-POPs 41 at the heads of the access rings, while less critical than that in the M/G-POP, is still high priority in that a lot of customers would be negatively affected in the event of an incident there.

The E-POP locations do not necessarily have direct out of band connectivity to the NOCs 135 or the SLM 100. The cost for providing an OOB solution in each E-POP is somewhat prohibitive using current WAN/PSTN services, since those POPs are so numerous. Instead, in the preferred embodiments, these sites are monitored and managed using in-band connectivity through the production network, as described above relative to FIGS. 2–4. The equipment in the E-POP is considered less critical, and technicians can be dispatched in the event the equipment there becomes unreachable by the operations support systems.

Each of the MI/G-POPs 53 has a router 181 installed with Ethernet and serial ports in addition to asynchronous hardware that will provide the connections to the console port of each device in the POP. Since the BlackDiamonds serving as the M-POP routers (MRs) 63, 65 and the Junipers serving as the G-POP routers (GRs) 73, 75 have multiple console ports on primary and redundant controller blades enough asynchronous ports should be provided to connect to all of these console ports to enable communication with agents running in those POP switches.

In the illustrated example, the OOB router 181 in each M/G POP 53 connects to the ports of the G-POP routers (GRs) 73 and 75, and the OOB router 181 connects to the ports of the M-POP routers (MRs) 63 and 65. The OOB routers 181 connect to a wide area network (WAN), preferably the frame relay network 183, for example, offered by AT&T or MCI, which serves as the independent WAN. Since low-speed but adjustable WAN connections are required, Frame Relay is the presently preferred technology for implementing the OOB WAN, however, those skilled in the art will recognize that other types of commercially available wide area networks may serve in place of the frame relay network 183. The OOB routers 181 also provide backup, in the form of dial-up connections through the public switched telephone network (PSTN) 187.

The M-POPs 41 at the heads of the access rings have routers 185 to enable the management systems to use OOB links to communicate with agents running in those switches. The routers could provide management connections to the frame relay network 183, but in the current implementation, these routers connect only to the PSTN 187. The routers 185 have only Ethernet and asynchronous ports, since these POPs do not have a WAN connection.

Since all of the OOB routers must connect to the two NOC networks, a hub and spoke design is called for, with the NOCs 133 and 135 forming the hubs and the MJG-POPs 53 forming the spokes. There will initially be two hub routers 191 and 193—one in each respective NOC. A PVC is provisioned between each NOC 133 or 135 and each M/G-POP 53. The NOC routers 191, 193 also do not need to be high speed or high capacity, because of design constraints within the chosen routing protocol.

The NOC routers 191, 193 have Ethernet connectivity (not separately shown) to the NOC LAN. The Ethernet LAN connectivity of the router 191 provides data communications to and from the network operations center equipment, represented by the exemplary NOC systems $1331$, in the NOC 133. Similarly, the Ethernet LAN connectivity of the router 193 provides communications to and from the network operations center equipment, represented by the exemplary NOC systems $135_1$, in the NOC 135. In this embodiment, the systems forming the SLM 100 reside at the location of the second NOC 135; and the Ethernet LAN connectivity of the router 193 provides data communications to and from those systems.

Each OOB router 181, 185, 191, 193 uses a modem (not separately shown) to connect to the PSTN network 187, for the last-resort connectivity between the respective management systems the connected switches in the POPs. One modem will connect to the AUX port on the OOB router in each M-POP and G-POP. An analog POTS line connects the modem to the PSTN network 187, to provide dial-up connectivity to the router in the event the M-POP or G-POP should become isolated from the rest of the production and OOB networks. Once a dial-up connection to the POP router is established, telnet works transparently to the rest of the area.

The PSTN network 187 and the modems on the various OOB routers, however, provide dialup ports, which are an obvious penetration point to the network equipment. Accordingly these dialup ports and the OOB routers should be carefully secured to prevent unauthorized access and activity. When an operator dials into the router, the router will present a "login" prompt as in a normal console connection. Once authenticated to the router the engineer can telnet to other devices connected thereto. It is preferred that an authentication protocol, such as RADIUS or TACACS+, should be used with dynamic password mechanism products, such as Security Dynamics Ace Server. In addition, SSH should be used on telnet sessions to keep these sessions private through means of encryption.

The production network as a whole forms a collection of OSPF Autonomous Systems linked together via an iBGP cloud. The OOB network uses OSPF as the internal IP routing protocol. In accord with an aspect of the invention, the out of band network forms a separate OSPF Autonomous System, into which all serial interface addresses on the OOB routers are configured. The OOB network is an exception to the iBGP connectivity rule in that the OOB network links to the production networks via ASBR and route redistribution. The OOB router in each M/G-POP serves as the ASBR for redistributing routing information between the OOB OSPF Autonomous System and the production network OSPF Autonomous System, in the region where the OOB router is located.

Hence, the OOB network forms a set of OSPF routing domains that are separate from those of the production network. The NOC routers 191 and 193 are in OSPF Area 0 of the OOB network domain. Each NOC router will act as an ABR between the NOC area 0 and the M/G-POP Areas, which will always be non-zero. Each NOC OOB router 191 or 193 and each M/G-POP OOB router 181 will run two routing processes and act as an ASBR router between the OOB AS and the Production AS. The NOC routers should run only two routing processes, 20 and never more than three.

Since the OOB network is a controlled network, there is a discrete set of available routes and no more. A distribute list is configured in-bound to the production network, so that the default route for the OOB network will not be injected into production regions in the event some device is improperly configured to generate the default. The NOC routers will be configured in a similar manner. The OOB network routes will be distributed naturally by OSPF to all areas, so that equipment can be maintained from any network location through the OOB network, in the event of a major network outage. But the OOB routers will use a distribute-list to block customer routes in the region to which these routers are attached from being distributed into the OOB network.

With this configuration alone, customers can not reach the carrier's management agents or equipment due to lack of bi-directional routes. Access-lists on the OOB routers' virtual terminal ports can also be used to filter out traffic from unauthorized source addresses.

J. OSS Computer Systems—Structure

Figure 12:
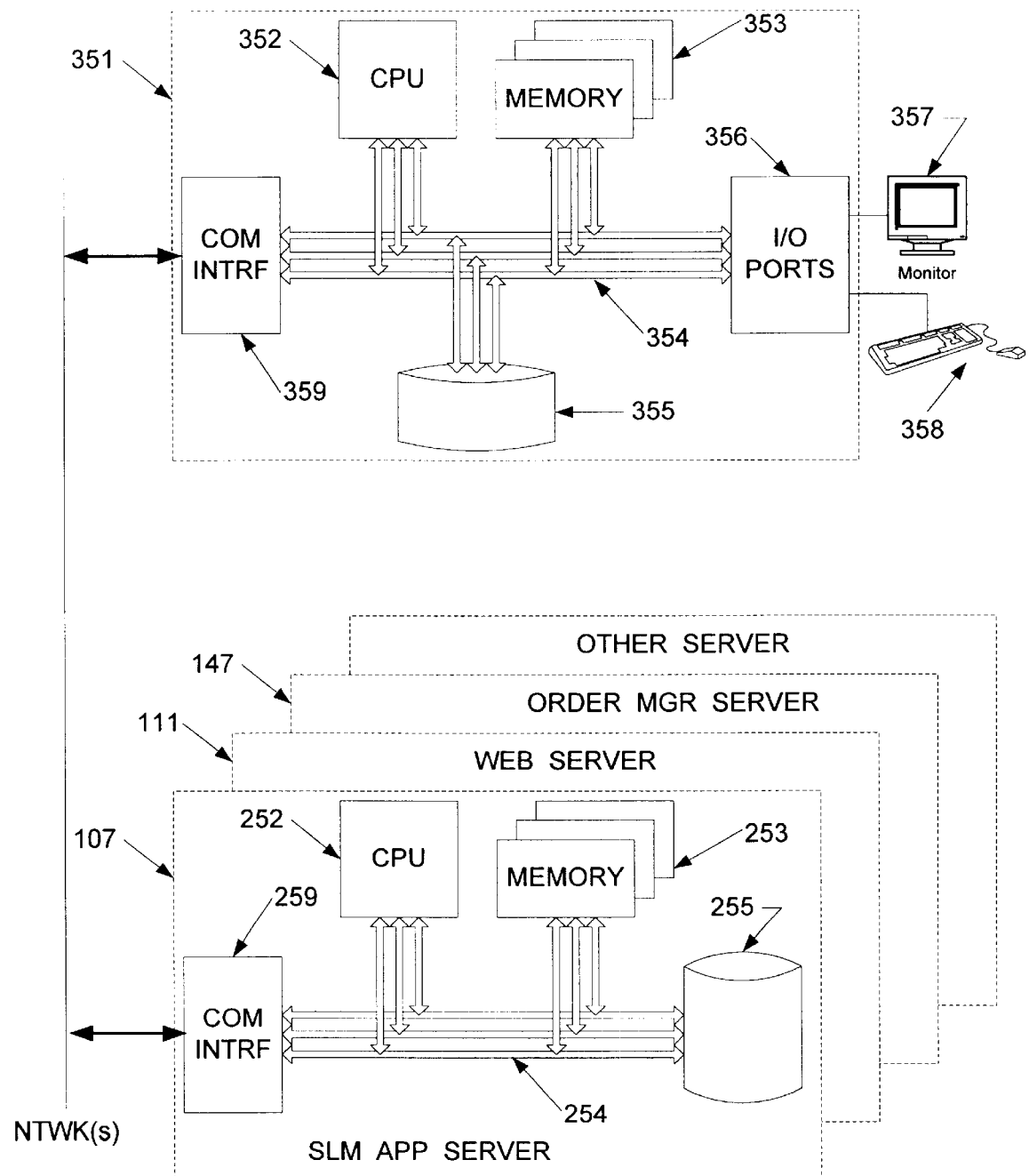
FIG. 12 is a functional block diagram of several general-purpose computers systems, which may run various software modules, to implement the inventive operations support systems.

From the discussion above, it should be clear that certain aspects of the preferred embodiments utilize programmed computer-processing systems to perform several inventive functions, including those of the service level manager (SLM), the Order Manager (OM), the web server, the latency agent, the traffic analyzer, and the like. To insure a complete understanding of how such systems may implement the invention, it may be helpful to review briefly the structure and operation of an example of such a processing system. FIG. 12 illustrates several general-purpose computer systems implementing the server functions, including the SLM application server 107, the web server 111 and the server operating as the Order Manager 147. Of these servers, the drawing shows a high-level block diagram of the SLM application server 107, as a representative example of the structure of such computer systems. This drawing also shows a general-purpose computer system 351, which may perform the functions of a user terminal, such as one of the staff terminals in either of the NOCs 133, 135.

For purposes of this simple example, each of the various computer systems is essentially a single computer, although those skilled in the art will recognize that each system may comprise more complex and/or distributed data systems. The servers systems may be located in a network operations center (NOC) with the user's computer system, or the servers may be at one or more other convenient locations.

Consider first the SLM application server 107 as an example of the servers. The exemplary computer system 107 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by the CPU 252. At least one mass storage system 255, preferably in the form of a disk drive or tape drive, stores the data tables of the topology database 109 and/or databases 117, 121 and 125. The mass storage 255 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 107.

The system 107 also includes one or more input/output interfaces for communications, shown by way of example as an interface 259 for data communications via the network. The interface 259 may include a modem, but preferably comprises one or more network interface cards, such as Ethernet cards. The communication interface 259 may include virtually any other appropriate data communications device. The physical communication links may be optical, wired, or wireless (e.g., via satellite or cellular network).

In accord with aspects of the invention, the interface 259 may connect the computer system 107 to a local area network, for communication with other operations support systems and staff terminal equipment, for example, at one of the NOC locations 135. Through the LAN and/or another interface card, the system 107 also has communications connectivity both to the production network (for SNMP communications and the like) and to the router 193 of the out-of-band (OOB) network.

The components contained in the computer system 107 are those typically found in general purpose computer systems used as servers, workstations, personal computers, network terminals, and the like. In fact, these components are intended to represent a broad category of such computer components that are well known in the art. The computer system 107 runs a variety of applications programs and stores data, enabling one or more interactions via a user interface (not shown), to implement the desired SLM application processing. Those skilled in the art will recognize that the computer system 107 will typically run a variety of other applications.

The server system 107 may implement the web server 111 and/or elements of the Order Manager 147. In the embodiment of FIG. 12, however, the web server 111 and the Order Manager 147 are separate computer systems, albeit similar in structure to the server 147 implementing the SLM application. The carrier may operate other similar servers, one of which appears in the drawings, to duplicate or distribute any or all of the application functions of the servers 107, 111 and 147 or to provide other related operations support services. The latency agents 127 and the traffic analyzers 128 may be implemented as similar general purpose computers, albeit with the interfaces for connection to switch ports as discussed earlier and with the software to perform the functions as outlined in the earlier descriptions.

The exemplary computer system 351 for a user station contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. At least one mass storage system 355, preferably in the form of a disk drive or tape drive, stores the data tables and/or reports retrieved from the various operation support databases discussed above. The mass storage 355 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 351.

The system 351 also includes one or more input/output interfaces for communications, shown by way of example as an interface 359 for data communications via the LAN at the NOC 135, and from that LAN to the out-of-band signaling network and preferably to the production network. The interface 259 could include a modem for telnet sessions, but preferably comprises one or more network interface cards, such as Ethernet cards. The communication interface 359 may include virtually any other appropriate data communications device. The physical communication links may be optical, wired, or wireless (e.g., via satellite or cellular network). In accord with aspects of the invention, the computer system 351 connects to a local area network, for communication with other operations support systems, such as the web server 111 and the order manager 147, at one of the NOC locations 135. Through the LAN and/or another interface card, the system 107 also has communications connectivity both to the production network (for SNMP communications and the like) and to the NOC router for the out-of-band (OOB) communications.

As a PC or workstation type implementation, the system 351 may further include appropriate input/output ports 356 for interconnection with a display 357 and a combination of keyboard and mouse serving as the physical input 358 for the user interface. For example, the computer may include a graphics subsystem to drive the output display 357. The output display 357 may include a cathode ray tube (CRT) display or liquid crystal display (LCD). Although not shown, the PC type system typically would include a port for connection to a printer. The input control devices for such an implementation of the system 351 would include the keyboard and mouse 358 for inputting alphanumeric and other key information. The input control devices for the system may include other forms of cursor control devices in place of the mouse, such as a trackball, stylus, joystick or cursor direction keys. The links of the peripherals 357, 358 to the system 351 may be wired connections or use wireless communications.

The components contained in the computer system 351 are those typically found in general purpose computer systems used as workstations, personal computers, network terminals, and the like. In fact, these components are intended to represent a broad category of such computer components that are well known in the art. The computer system 351 runs a variety of applications programs and stores data, enabling one or more interactions via the user interface, provided through elements such as 357 and 358, and/or over the various LAN and network connects, to allow the operator to access the operations support data and to execute various network control operations.

K. Software—Media

Certain aspects of the invention relate to the software elements, such as the executable code and the database(s) used to implement the service level manager and the associated databases, the web server and the Order Manager function. The databases may be implemented as flat files, although preferably, the databases take the form of relational databases. It is envisioned that the databases may utilize multi-dimensional database software or any other database software having the desired properties, as outlined above.

At different times all or portions of the executable code or database(s) for any or all of these software elements may reside in physical media or be carried by electromagnetic media. Physical media include the memory of the computer processing systems, switches, agents and/or analyzers, such as various semiconductor memories, tape drives, disc drives and the like of the general-purpose computer systems, etc. All or portions of the software may at times be communicated through the production network, the out-of-band network, or various other telecommunication networks. Such communications, for example, may be to load the software from another computer (not shown) into the respective system 107, 111, 147 or 351 (FIG. 12), into the latency agent 127, into the traffic analyzer 128, into a switch at one of the POPs, or into another network element. Thus, another type of media that may bear the software elements includes optical, electrical and electromagnetic waves, such as used across physical interfaces between local devices, through wired and optical landline networks and over various airlinks.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A service level manager for operations support in an extended-area data communications network, the service level manager comprising:

at least one network database storing network topology information and arranged to receive and store dynamic service-related operations data from agents in the extended-area data communications network;

a persistence layer module arranged to process data from the at least one network database, to provide data representing a dynamic view of the topology and operations of the extended-area data communications network;

a user interface for providing information to and receiving inputs from users; and a service level manager application in communication with the persistence layer module and the user interface, for:

(1) monitoring operations of the extended-area data communications network by analyzing semantic transparency or time transparency of data traffic through the network based on the data provided by the persistence layer module, (2) providing reports to users via the user interface, of the monitored network operations with respect to specific network services, and (3) interacting with elements of the extended-area data communications network to control service traffic through the extended-area data communications network.

2. A service level manager as in claim 1, wherein the user interfaces comprises a web server accessible to customers and to operations staff for the extended-area data communications network.

3. A service level manager as in claim 1, wherein the service level manager application comprises one or more Enterprise Java Beans.

4. A service level manager as in claim 1, wherein the dynamic service-related operations data received and stored in the database comprises one or more types of data about the aspects of operations of the extended-area data communications network selected from the group consisting essentially of: network health parameters, latencies through the extended-area data communications network, latencies through the Internet, and dynamic session-related traffic information.

5. A service level manager as in claim 1, wherein the service level manager application comprises:
   a) a topology service module for obtaining network or service topology information from the at least one network database, and
   b) a monitoring service module communicating with the agents to obtain the dynamic service-related operations data form the agents; and
   c) a provisioning service module for converting a service provisioning request into instructions for implementing a service change identified by the request, based at least in part on the network or service topology information obtained by the topology service module, and
   d) a measurement service module for computing the reports of the monitored network operations from the data obtained by the monitoring service module.

6. A service level manager as in claim 1, wherein the service level manager application is arranged to interact with the elements of the extended-area data communications network to control the service traffic, in response to an input received via the user interface.

7. A service level management system, for operations support in an extended-area data communications network, the service level management system comprising:
   an agent plane, comprising
      a) a plurality of first agents at various points in the extended-area data communications network, the first agents for providing information regarding topology of the extended-area data communications network or topology of services provided through the network; and
      b) a plurality of second agents at various points in the extended-area data communications network, the second agents for providing information regarding performance of the extended-area data communications network; and
   a service level management plane comprising at least one server programmed to automatically implement functions comprising:
      1) a topology service for determining a network or a service topology from the information provided by the first agents;
      2) a provisioning service for interacting with elements of the extended-area data communications network to control service traffic through the extended-area data communications network based at least in part on the determined topology;
      3) a monitoring service for accumulating data from the second agents; and
      4) a measurement service for processing the accumulated data to form one or more reports as to dynamic operations of the extended-area data communications network.

8. A service level management system as in claim 7, wherein the second agents comprise agents selected from one or more categories in the group consisting essentially of: Simplified Network Management Protocol (SNMP) Agents, Remote Monitor Protocol (RMON) Agents, System Agents, Latency Measurement Agents, Utilization Agents, and traffic analysis agents.

9. A service level management system as in claim 7, further comprising one or more databases storing information received from the first and second agents.

10. A service level management system as in claim 7, wherein the service level management plane further comprises a user interface for receiving user inputs including at least one provisioning request for the provisioning service and for outputting the one or more reports from the measurement service.

11. A service level management system as in claim 10, wherein the user interface comprises a web server.

12. A service level management system as in claim 7, wherein the service level management plane comprises one or more Enterprise Java Beans running as programs in the at least one server for implementing the topology service, the provisioning service, the monitoring service, and the measurement service.

13. A service level management system as in claim 12, further comprising one or more relational databases storing information received from the first and second agents, wherein the service level management plane further comprises a Java Database Connectivity (JDBC) driver to enable the one or more Enterprise Java Beans to access information in the one or more relational databases.

14. A service level management system as in claim 7, further comprising a work order management system coupled to obtain information from the service level management plane and to provide provisioning orders to the provisioning service.

15. A software product for a service level manager for operations support in an extended-area data communications network, the software product comprising:
   at least one machine readable medium;
   programming code, carried by the at least one machine readable medium, for execution by a programmable computer, coupled for management communication with elements of the extended-area data communications network and having a user interface, wherein execution of the programming code causes the programmable computer to perform the following steps:
      1) determining topology of the extended-area data communications network or topology of services provided through the network, from information provided by agents at various points in the extended-area data communications network;
      2) interacting with elements of the extended-area data communications network to control service traffic through the extended-area data communications network based at least in part on the determined topology;
      3) accumulating data information regarding performance of the extended-area data communications network from agents at various points in the extended-area data communications network; and
      4) processing the accumulated data to form one or more reports as to dynamic operations of the extended-area data communications network.

16. A software product as in claim 15, wherein the programming code comprises Enterprise Java Beans.

17. A software product as in claim 15, further comprising a database carried by the at least one machine readable medium, the database comprising topology information and dynamic network performance information compiled from the information provided by the agents.

18. A software product as in claim 17, wherein the database comprises two or more types of data about the aspects of operations of the extended-area data communications network selected from the group consisting essentially of: network topology, service topology, network health parameters, utilization parameters, latencies through the extended-area data communications network, latencies through the Internet, and dynamic session-related traffic information.

19. A method for providing service level management in an extended-area data communications network, the method comprising:
- determining topology of the extended-area data communications network or topology of services through the network from information provided by agents at various points in the extended-area data communications network;
- interacting with elements of the extended-area data communications network to control service traffic through the extended-area data communications network based at least in part on the determined topology;
- accumulating information regarding performance of the extended-area data communications network from agents at various points in the extended-area data communications network; and
- processing the accumulated data to form one or more reports as to dynamic operations of the extended-area data communications network.

20. A method as in claim 19, further comprising outputting at least one report to a terminal at a network operations center.

21. A method as in claim 19, further comprising outputting at least one report to a terminal of a customer.

22. A method as in claim 19, further comprising outputting at least one report as a web page.

23. A method as in claim 19, wherein the step of interacting with elements of the network to control service traffic is responsive to user input of a provisioning request.

24. A method as in claim 23, wherein the provisioning request is received from a terminal at a network operations center.

25. A method as in claim 23, wherein the provisioning request is received from a customer terminal.

26. A method as in claim 23, wherein the provisioning request is received via a web interface.

27. A method as in claim 19, wherein the accumulated information regarding performance of the extended-area data communications network comprises data relating to one or more metrics selected from the group consisting essentially of: network availability, service availability and reachability.

28. A method as in claim 27, wherein the accumulated information regarding performance of the extended-area data communications network further comprises data regarding latencies effecting data traffic transported through the extended-area data communications network.

29. A method as in claim 27, wherein the accumulated information regarding performance of the extended-area data communications network further comprises session-related information regarding specific services through the extended-area data communications network.

30. A distributed network, for providing data communications services in a plurality of separated regions, comprising:
a plurality of regional networks, each regional network comprising:
  (a) a plurality of access ring networks, each access ring network comprising:
    i) a plurality of edge-point of presence (E-POP) switches,
    ii) data links from the E-POP switches to individual customer locations,
    iii) at least one mega-point of presence (M-POP) switch, and
    iv) an optical fiber access ring interconnecting the E-POP switches and the at least one M-POP switch;
  (b) an optical fiber backbone ring interconnecting the M-POP switches of the access ring networks; and
  (c) at least one giga-point of presence (G-POP) switch coupled to the optical fiber backbone ring, for providing data communication to the Internet and for providing data communication to and from at least one other of the regional networks via the Internet; and
an operations support system comprising:
  a plurality of agents at various points in each of the regional networks for providing information regarding performance of the regional networks; and
  a service level management system comprising:
    (1) at least one database, for storing information regarding topology of the distributed network or topology of services provided through the distributed network and for storing the performance information provided by the agents; and
    (2) an application server having access to the database and a user interface, wherein:
      i) the application server is for interacting with of a plurality of the POP switches in the regional networks to control service traffic through the distributed network based at least in part on the topology information in the database, and
      ii) the application server is for processing the performance information in the database to form one or more reports as to dynamic operations of the extended-area data communications network for output via the user interface.

31. A network as in claim 30, further comprising a network operations center with one or more user terminals coupled for access to the application server through the user interface, for instructing the application server to implement control of a service and for receiving the one or more reports from the application server.

32. A network as in claim 31, further comprising an out of band network connected to the application server and the network operations center and to at least the G-POP switches in the regional networks.

33. A network as in claim 32, wherein the out of band network comprises a wide area data network and dial-up links through the public switched telephone network.

34. A network as in claim 30, wherein the E-POP switches and the M-POP switches are configured to utilize elements of a local area networking protocol as layer 1 and layer 2 protocols for transport of end user communications throughout the regional networks.

35. A distributed network, for providing data communications services in a plurality of separated regions, comprising:
a plurality of regional networks, each regional network comprising:
  (a) a plurality of access ring networks, each access ring network comprising i) a plurality of edge-point of presence (E-POP) switches,
ii) data links from the E-POP switches to individual customer locations,
iii) at least one mega-point of presence (M-POP) switch, and
iv) an optical fiber access ring interconnecting the E-POP switches and the at least one M-POP switch;
(b) an optical fiber backbone ring interconnecting the M-POP switches of the access ring networks; and
(c) at least one giga-point of presence (G-POP) switch coupled to the optical fiber backbone ring, for providing data communication to the Internet and for providing data communication to and from at least one other of the regional networks via the Internet; and an operations support system comprising:
(1) a plurality of operations support agents at various points in each of the regional networks, including agents at the G-POP switches for monitoring and control of the G-POP switches;
(2) an operations and support management system server; and
(3) an out of band signaling system, comprising:
   i) a first router coupled to the operations and support management system server;
   ii) a plurality of second routers coupled to the agents at the G-POP switches; and
   iii) a communication network, separate from the regional networks, connected between the routers, for providing data communications between the operations and support management system server and the agents at the G-POP switches.

36. A distributed network as in claim 35, wherein the out-of-band signaling network comprises a wide area data network operating independently of the regional networks.

37. A distributed network as in claim 36, wherein the wide area data network comprises a frame relay network.

38. A distributed network as in claim 36, wherein the out-of-band signaling network further comprises dial-up links connecting the routers to the public switched telephone network.

39. A distributed network as in claim 35, wherein the at least one operations and support management system comprises a network operations center.

40. A distributed network as in claim 35, wherein the at least one operations and support management system comprises an order management system.

41. A distributed network as in claim 35, wherein the E-POP switches and the M-POP switches are configured to utilize elements of a local area networking protocol as layer 1 and layer 2 protocols for transport of end user communications throughout the regional networks.

42. A distributed network as in claim 35, wherein the at least one operations and support management system comprises:
a database, for storing information regarding performance of the regional networks obtained and provided by a plurality of the agents; and
an application server having access to the database and a user interface.

43. A distributed network as in claim 42, wherein the application server is for interacting with elements of a plurality of the POP switches in the regional networks to control service traffic through the distributed network based at least in part on topology information stored in the database.

44. A distributed network as in claim 42, wherein the application server is for processing the performance information in the database to form one or more reports as to dynamic operations of the extended-area data communications network for output via the user interface.

* * * * *